US006445577B1

(12) United States Patent
Madsen et al.

(10) Patent No.: US 6,445,577 B1
(45) Date of Patent: Sep. 3, 2002

(54) CASE WITH COMMUNICATION MODULE HAVING A DOUBLE PIN HINGE FOR A HANDHELD COMPUTER SYSTEM

(75) Inventors: Brent D. Madsen, Providence, UT (US); Eric Michael Lunsford, San Carlos, CA (US); David Moore, Riverton, UT (US)

(73) Assignee: 3Com Corporation, Santa Clara, CA (US)

( * ) Notice: Subject to any disclaimer, the term of this patent is extended or adjusted under 35 U.S.C. 154(b) by 31 days.

(21) Appl. No.: 09/665,492

(22) Filed: Sep. 20, 2000

(51) Int. Cl.$^7$ ................................................ H05K 5/00
(52) U.S. Cl. ................. 361/683; 361/680; 361/679; 361/727; 206/320; 220/334
(58) Field of Search .................. 361/679, 680, 361/681–683, 726–727, 736, 755, 741, 747, 752, 748, 759, 786, 796–803, 816, 818, 825, 829, 784; 341/22; 345/168–172, 905; 235/145; 248/917, 176.1, 176.3, 346.03, 912; 400/489, 682, 691–693; 312/208.1, 206.4; 366/708.1; 174/35 R, 51; 379/433, 428, 434, 438; 455/90, 300, 30; 403/331; 307/89–91; 439/65–67, 341, 165.31; 206/320, 305; 211/13.1, 26, 26.1, 26.2

(56) References Cited

U.S. PATENT DOCUMENTS

| | | | | |
|---|---|---|---|---|
| 4,825,395 A | * | 4/1989 | Kinser et al. ............... | 364/708 |
| 5,002,184 A | * | 3/1991 | Lloyd ......................... | 206/305 |
| 5,337,061 A | * | 8/1994 | Pye et al. ................... | 343/702 |
| 5,640,689 A | * | 6/1997 | Rossi .......................... | 455/89 |
| 5,827,082 A | * | 10/1998 | Laine ......................... | 439/165 |
| 5,898,600 A | * | 4/1999 | Isashi ...................... | 364/705.01 |
| 5,995,373 A | * | 11/1999 | Nagai ......................... | 361/755 |
| D426,236 S | * | 6/2000 | Kim et al. ................. | D14/345 |
| 6,079,993 A | * | 6/2000 | Laine ......................... | 439/165 |
| 6,239,968 B1 | * | 5/2001 | Kim et al. .................. | 361/679 |
| D445,106 S | * | 7/2001 | Mosgrove et al. ......... | D14/338 |
| 6,266,240 B1 | * | 7/2001 | Urban et al. ................ | 361/686 |
| D447,478 S | * | 9/2001 | Madsen et al. ............ | D14/341 |
| 6,317,313 B1 | * | 11/2001 | Mosgrove et al. .......... | 361/680 |

FOREIGN PATENT DOCUMENTS

| | | | | | |
|---|---|---|---|---|---|
| JP | | 408016859 A | * | 1/1996 | ........... G07C/09/00 |
| JP | | 410262105 A | * | 9/1998 | ........... H04M/01/21 |

* cited by examiner

Primary Examiner—Darren Schuberg
Assistant Examiner—Michael Datskovsky
(74) Attorney, Agent, or Firm—Wagner, Murabito & Hao LLP

(57) ABSTRACT

A case for a handheld computer system is described. In an embodiment, the handheld computer system comprises a personal digital assistant. The case has multi-functional capability. The case provides a protective housing for the personal digital assistant and includes a communication module which is integrated into the case for protection against damage, whereas the communication module transmits and receives data for the personal digital assistant. In an embodiment, the communication module comprises a radio frequency (RF) wireless communication device. In an embodiment, the case includes a front cover and a back cover coupled to the front cover via a double pin hinge. The personal digital assistant is inserted between the front and back covers, whereas the front cover protects the front of the personal digital assistant while the back cover protects the back of the personal digital assistant. The double pin hinge allows the front and back covers to rotate to a generally back-to-back position and to rotate to a generally front-to-front position, facilitating approximately 360 degree rotation about the double pin hinge by the combination of the rotations of each of the front and back covers. Additionally, the communication module is integrated into the front cover. The back cover includes a connector which couples to a communication port located on the back of the personal digital assistant, whereas the connector couples to the personal digital assistant inserted inside the protective housing formed by the front and back covers.

42 Claims, 18 Drawing Sheets

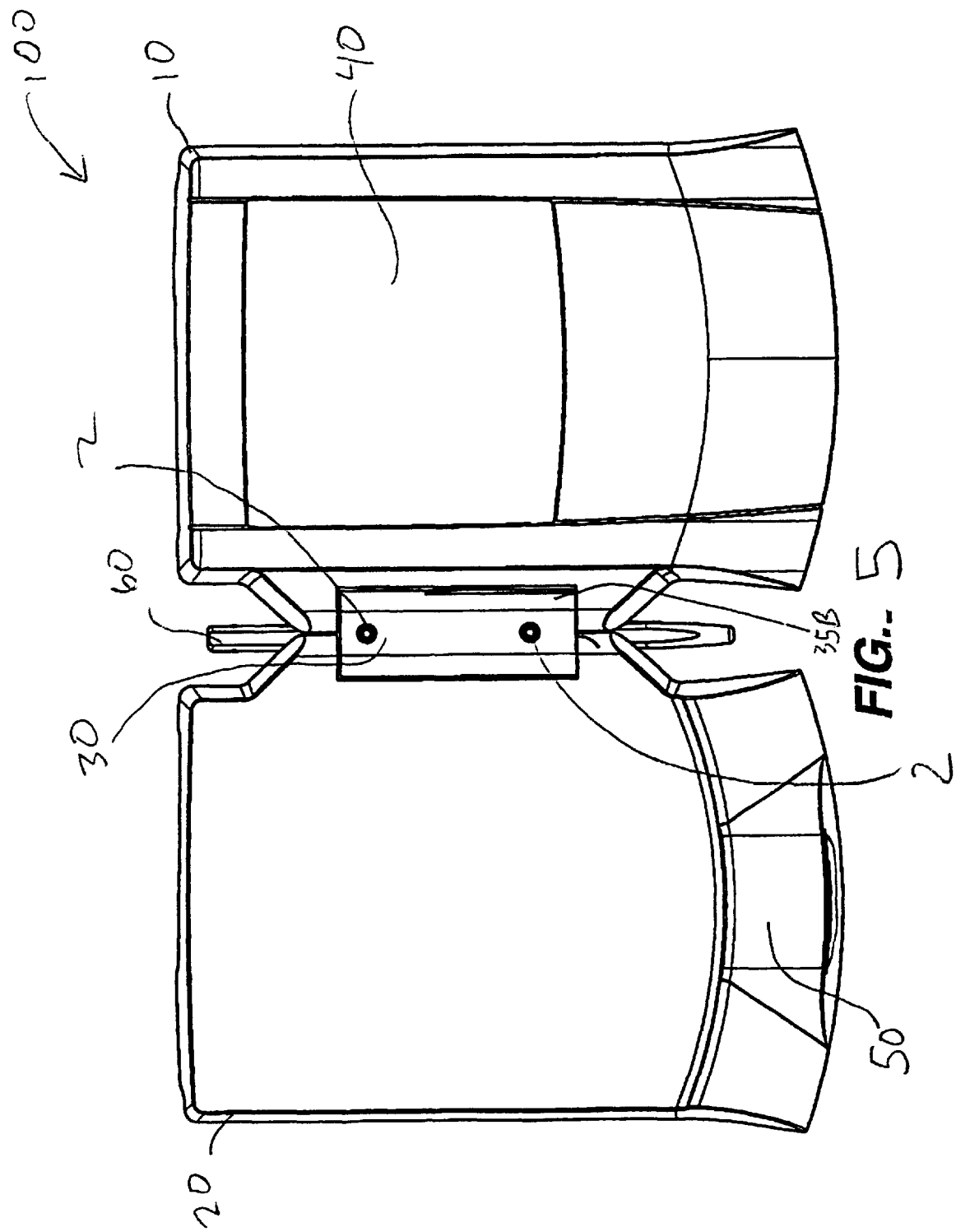

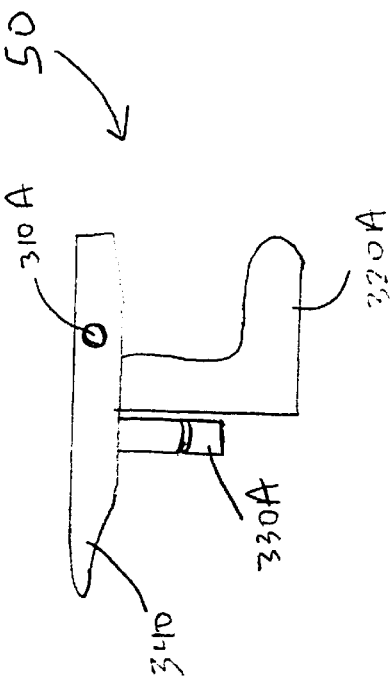
Fig. 21
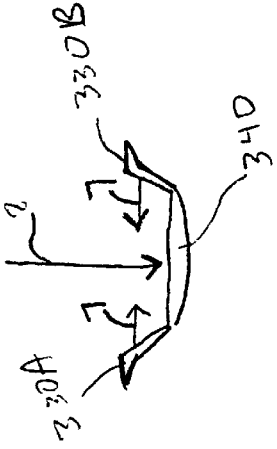
Fig. 22
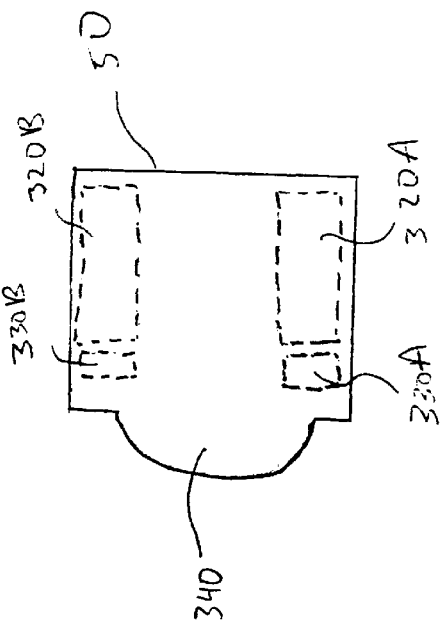
Fig. 20
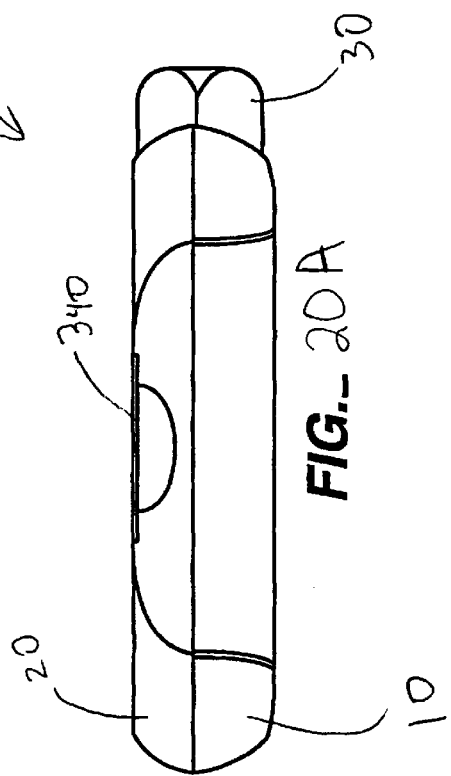
FIG._20A

CASE WITH COMMUNICATION MODULE HAVING A DOUBLE PIN HINGE FOR A HANDHELD COMPUTER SYSTEM

BACKGROUND OF THE INVENTION

1. Field of the Invention

The present invention generally relates to the field of cases for handheld computer systems. More particularly, the present invention relates to the field of multi-functional cases for handheld computer systems.

2. Related Art

Computer systems and other electronic systems or devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of computer systems is dramatically enhanced by coupling these stand-alone computer systems together in order to form a networking environment. Within a networking environment, users may readily exchange files, share information stored on a common database, pool resources, and communicate via electronic mail (e-mail) and via video teleconferencing. Furthermore, computer systems or other types of electronic devices which are coupled to the Internet provide their users access to data and information from all over the world.

A personal digital assistant (commonly referred to as a PDA) is a handheld computer system. It is appreciated that the personal digital assistant is a portable handheld device that is used as an electronic organizer which has the capability to store a wide range of information that includes daily appointments, numerous telephone numbers of business and personal acquaintances, and various other information. Furthermore, the personal digital assistant has the ability to connect to a personal computer system, enabling the two devices to exchange updated information or to synchronize their respective stored information. Additionally, the personal digital assistant can also be connected to a modem, enabling it to have electronic mail (e-mail) capabilities over the Internet along with other Internet capabilities. Moreover, an advanced personal digital assistant can have Internet capabilities over a wireless communication interface (e.g., radio interface). Also, the personal digital assistant can be coupled to a networking environment.

Some users of the personal digital assistant purchase accessories such a conventional case. The conventional case for the personal digital assistant typically includes a front cover and a back cover coupled to the front cover via a single pin hinge, whereas the personal digital assistant is inserted between the front and back covers. In general, the conventional case is comprised of hard materials including, for example, hard plastic, metal, or wood; soft materials, including, for example, leather or soft plastic; or a combination of both. The conventional case protects the personal digital assistant against damage and maintains the clean and neat appearance of the personal digital assistant.

In particular, users of the personal digital assistant purchase the conventional case to protect the data input device (e.g., handwriting recognition device or digitizer) and the display device of the personal digital assistant, to protect the personal digital assistant against damage from being accidentally dropped from a pocket or briefcase or during use, and to prevent accidental activation of the buttons of the personal digital assistant. Moreover, the conventional case does not allow the user to view the display device or access the buttons of the personal digital assistant when the personal digital assistant is placed in a conventional cradle which facilitates synchronizing the data of the personal digital assistant with the data of a personal computer system and which facilitates recharging the batteries of the personal digital assistant, whereas the conventional cradle includes a connector which couples to the communication port (e.g., a serial communication port) of the personal digital assistant. Thus, the user typically separates the conventional case from the personal digital assistant before placing the personal digital assistant in the conventional cradle.

Typically, capability for wireless communication via a radio frequency (RF) link is provided to the personal digital assistant by coupling a wireless communication peripheral to the personal digital assistant and to a communication port (e.g., a serial communication port) of the personal digital assistant. Usually, the wireless communication peripheral latches to the back of the personal digital assistant or couples to an end of the personal digital assistant, without providing protection for the data input device (e.g., handwriting recognition device or digitizer) and the display device of the personal digital assistant. Typically, the wireless communication peripheral is comparable in size and weight to the personal digital assistant, adding appreciable bulk and thickness to the form-factor of the personal digital assistant. The conventional case is unable to receive the personal digital assistant while the wireless communication case is coupled to the personal digital assistant, forcing the user to choose between protecting the personal digital assistant and adding RF wireless communication capability to the personal digital assistant.

Moreover, when the wireless communication peripheral is coupled to the personal digital assistant, the user is unable to place the personal digital assistant in the conventional cradle which facilitates synchronizing the data of the personal digital assistant with the data of a personal computer system and which facilitates recharging the batteries of the personal digital assistant, whereas the conventional cradle includes a connector which couples to the communication port (e.g., a serial communication port) of the personal digital assistant. Thus, the user typically separates the wireless communication peripheral from the personal digital assistant before placing the personal digital assistant in the conventional cradle.

Unfortunately, the user faces a difficult choice in deciding on the carrying configuration for the personal digital assistant. In one option, the user can carry the personal digital assistant coupled to the wireless communication peripheral, leaving the personal digital assistant vulnerable to damage from accidents and to contamination from dirt, dust, and debris. In another option, the user can carry the personal digital assistant in the conventional case, leaving the personal digital assistant without RF wireless communication capability. In yet another option, the user can carry the personal digital assistant, the conventional case, and the wireless communication peripheral, switching between the conventional case and the wireless communication peripheral when necessary. However, in this option, the user may find that he/she has insufficient space (e.g., in a pocket, briefcase, etc.) to carry all three objects and that he/she is susceptible to losing or misplacing either the conventional case or the wireless communication peripheral. Moreover, in this option, the user may find it inconvenient and obtrusive to carry all three objects since convenience, reduced-obtrusiveness, and compact form-factor are important factors in deciding to purchase the personal digital assistant and accessories such as the conventional case and the wireless communication peripheral.

SUMMARY OF THE INVENTION

A case for a handheld computer system is described. In an embodiment, the handheld computer system comprises a personal digital assistant. The case has multi-functional capability. The case provides a protective housing for the personal digital assistant and includes a communication module which is integrated into the case for protection against damage, whereas the communication module transmits and receives data for the personal digital assistant. In an embodiment, the communication module comprises a radio frequency (RF) wireless communication device.

The case has a compact form-factor which complements the form-factor of the personal digital assistant. In particular, the design, positioning, and selection of components achieves a marked reduction in the thickness of the case compared to the combination of the conventional case and wireless communication peripheral of the prior art. Moreover, the case is lightweight but durable and resilient. In addition, the case has a stylish, sleek appearance.

In an embodiment, the case includes a front cover and a back cover coupled to the front cover via a double pin hinge. The personal digital assistant is inserted between the front and back covers, whereas the front cover protects the front of the personal digital assistant while the back cover protects the back of the personal digital assistant. The double pin hinge allows the front and back covers to rotate to a generally back-to-back position and to rotate to a generally front-to-front position, facilitating approximately 360 degree rotation about the double pin hinge by the combination of the rotations of each of the front and back covers. Additionally, the communication module is integrated into the front cover. The back cover includes a connector which couples to a communication port located on the back of the personal digital assistant, whereas the connector couples to the personal digital assistant inserted inside the protective housing formed by the front and back covers. In an embodiment, the connector comprises a latching connector which electrically couples to the communication port and which couples to the personal digital assistant.

The double pin hinge facilitates routing an electrical link between the communication module positioned in the front cover and the connector positioned in the back cover.

In an embodiment, the latching connector couples to the back cover such that the latching connector can be rotated about a pivot axis to a latched position and to an unlatched position. When the latching connector is rotated to the latched position, the latching connector latches to the back cover and couples (electrically and physically) to the personal digital assistant inserted inside the protective housing formed by the front and back covers. When the latching connector is rotated to the unlatched position, the latching connector unlatches from the back cover, uncouples (electrically and physically) from the personal digital assistant, and rotates through an opening in the back cover to a position outside the protective housing formed by the front and back covers.

In an embodiment, the front cover includes an inner front cover and an outer front cover. The back cover includes an inner back cover and an outer back cover. Moreover, the outer front cover includes an opening or window. A metal plate is coupled to the opening. The metal plate has a thickness that is smaller than the thickness of the outer front cover. In an embodiment, the communication module is positioned between the metal plate and the inner front cover, whereas the metal plate protects the communication module from damage and reduces the stack thickness of the combination of the outer front cover, metal plate, communication module, and inner front cover.

Additionally, the metal plate is a passive radiator. The communication module includes an antenna for radiating energy, whereas the antenna is positioned under the passive radiator. In an embodiment, energy from the antenna is coupled to the passive radiator to form coupled energy. The passive radiator radiates the coupled energy. The passive radiator includes a length and a width. The radiation pattern of the antenna system formed by the antenna and the passive radiator is dependent on the length and width of the passive radiator. Moreover, the bandwidth and gain of the antenna system is dependent on the length and width of the passive radiator. More importantly, the performance of the antenna system is optimized by the appropriate selection of the length and width of the passive radiator.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Case for a Handheld Computer System

Although the handheld computer system described below comprises a personal digital assistant, it should be understood that the case of the present invention can be utilized to protect other types of handheld computer systems.

Figure 1:
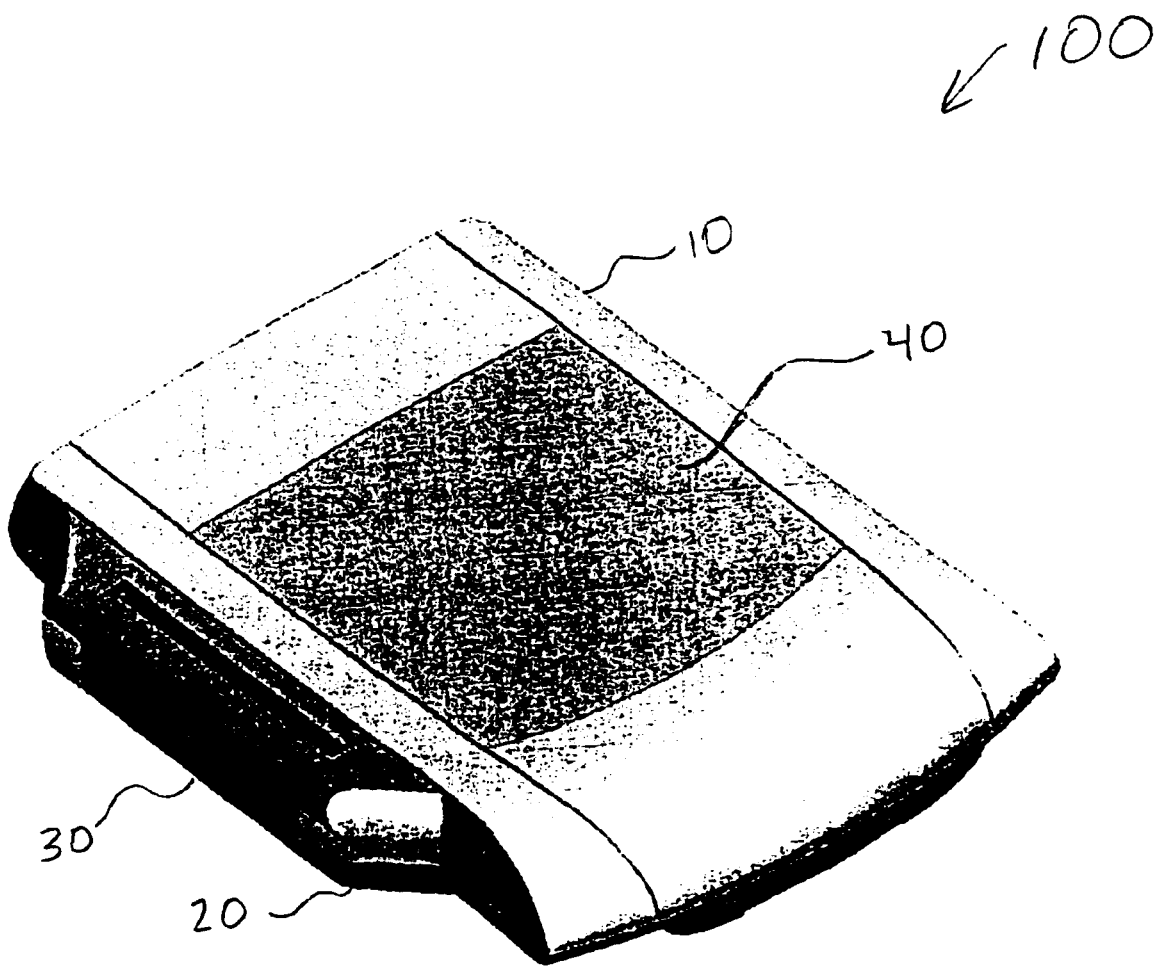
FIG. 1 illustrates a front perspective view of a case in accordance with an embodiment of the present invention, showing the case in a closed position.

FIG. 1 illustrates a front perspective view of a case 100 in accordance with an embodiment of the present invention, showing the case 100 in a closed position. The case 100 forms a protective housing that protects a personal digital assistant (not shown) which is inserted inside the case 100. The case 100 has a compact form-factor which complements the form-factor of the personal digital assistant. In particular, the design, positioning, and selection of components achieves a marked reduction in the thickness of the case 100 compared to the combination of the conventional case and wireless communication peripheral of the prior art. Moreover, the case 100 is lightweight but durable and resilient. In addition, the case 100 has a stylish, sleek appearance. In an embodiment, the case 100 is implemented with a hardcase body.

As illustrated in FIG. 1, the case 100 includes a front cover 10 and a back cover 20 coupled to the front cover via a hinge 30. In an embodiment, the hinge 30 comprises a double pin hinge 30. As will be discussed below, the double pin hinge 30 allows the front cover 10 and the back cover 20 greater rotational freedom than the single pin hinge of the conventional case of the prior art, permitting the front cover 10 and the back cover 20 to rotate to a generally back-to-back position and to rotate to a generally front-to-front position (as illustrated in FIG. 1).

The case 100 has multi-functional capability. The case provides a protective housing for the personal digital assistant and includes a communication module which is integrated into the front cover 10 of the case 100 for protection against damage, whereas the communication module transmits and receives data via a wireless link for the personal digital assistant. The case 100 of the present invention addresses the need for a device that combines the functionality of the conventional case of the prior art and the functionality of the wireless communication peripheral of the prior art while maintaining style, compact form-factor, and a minimum body thickness. The case 100 provides convenience and increases productivity because of its multi-functionality.

By integrating the communication module into the front cover 10 of the case 100, protection against damage for the personal digital assistant and the communication module is attained and, yet, the case 100 is less obtrusive to the user than the combination of the conventional case (which does not allow for the addition of accessories to the personal digital assistant) and the wireless communication peripheral of the prior art. In particular, the case 100 is well suited to meet the needs of users that strongly resist purchasing bulky accessories for the personal digital assistant.

Referring again to FIG. 1, the case 100 includes a metal plate 40 which is coupled to an opening or window in the front cover 10. The metal plate 40 has a generally rectangular shape. The use of the metal plate 40 allows the front cover 10 assembly to be reduced in thickness while continuing to provide sufficient protection against damage, as will be described below.

As shown in FIG. 1, the front cover 10 is configured to couple to a first pivot pin channel of the double pin hinge 30. Additionally, the back cover 20 is configured to couple to a second pivot pin channel of the double pin hinge 30.

Figure 2:
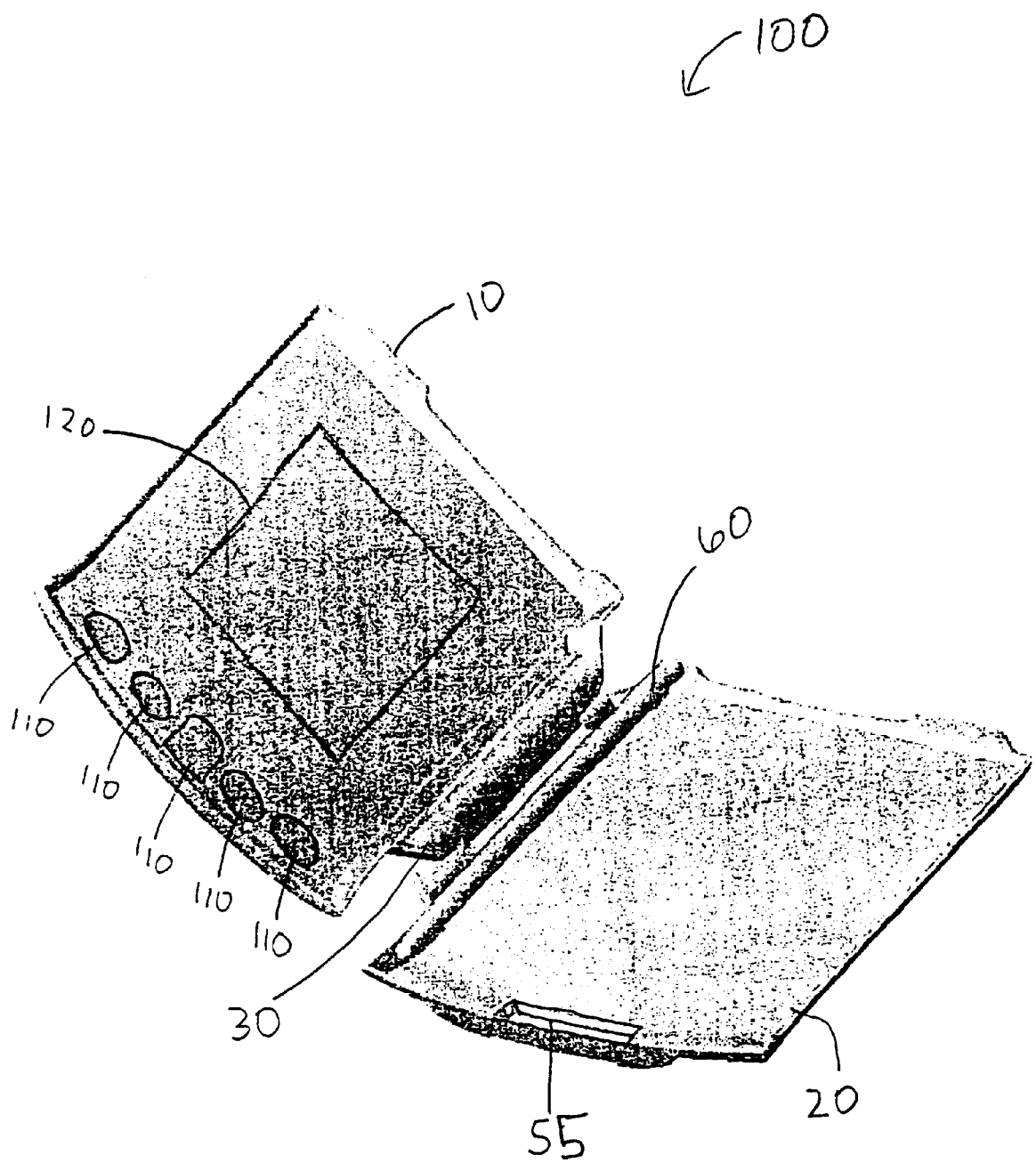
FIG. 2 illustrates a front perspective view of a case in accordance with an embodiment of the present invention, showing the case in an open position.

FIG. 2 illustrates a front perspective view of a case 100 in accordance with an embodiment of the present invention, showing the case 100 in an open position. The inner surface of the front cover 10 includes a plurality of recesses 110 to allow the front cover 10 to easily fit over the front of the personal digital assistant, which has a plurality of buttons extending from the front surface of the personal digital assistant. Additionally, the inner surface of the front cover 10 includes a projecting center surface 120. As will be discussed below, this projecting center surface 120 occupies a space or recess above the display device of the personal digital assistant so that to provide additional space for integrating the communication module into the front cover 10.

Moreover, the double pin hinge 30 includes a rod or center rail 60 which allows easy insertion and removal of the personal digital assistant with respect to the case 100. The rod 60 is shaped like a stylus so that the rod 60 can be inserted into a stylus slot of the personal digital assistant to couple the personal digital assistant to the case 100. In practice, the personal digital assistant is slid into the rod 60.

Referring again to FIG. 2, the inner surface of the back cover 20 includes an opening 55 for receiving a connector (not shown) which couples to a communication port of the personal digital assistant, whereas the communication port is positioned on the lower rear of the personal digital assistant. In an embodiment, the communication port comprises a serial communication port. As will be described below, an electrical link (not shown) is coupled to the communication module and to the connector via the double pin hinge 30.

Figure 3:
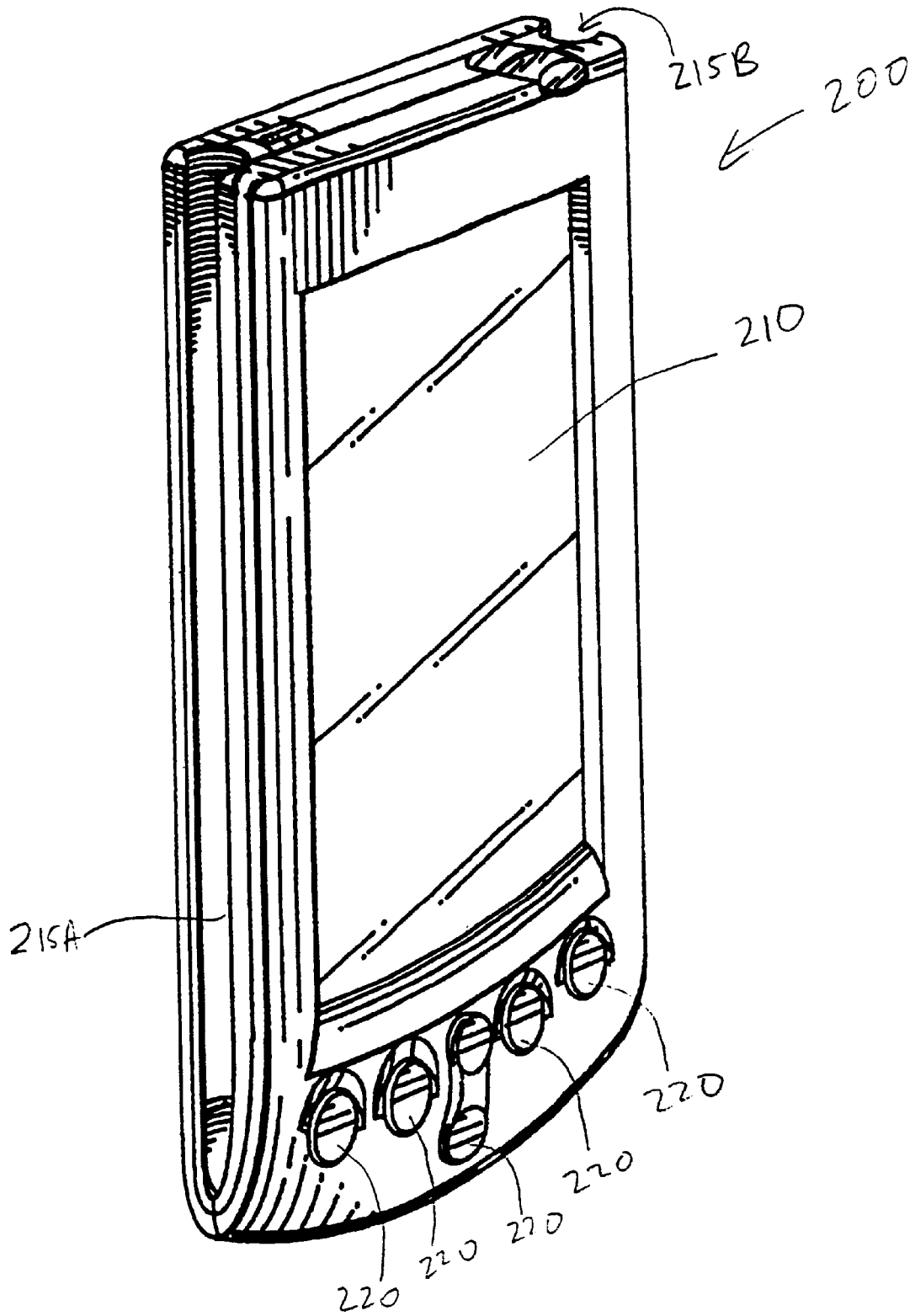
FIG. 3 illustrates an exemplary personal digital assistant which can be inserted in a case of the present invention.

FIG. 3 illustrates an exemplary personal digital assistant 200 which can be inserted in a case 100 of the present invention. It should be understood that other types of personal digital assistants 200 can be inserted in the case 100.

Referring to FIG. 3, the display device 210 and the recess which is formed above the display device 210 is illustrated. In addition, the exemplary personal digital assistant 200 includes a plurality of buttons 220. Moreover, the exemplary personal digital assistant includes a first stylus slot 215A and a second stylus slot 215B.

Figure 4:
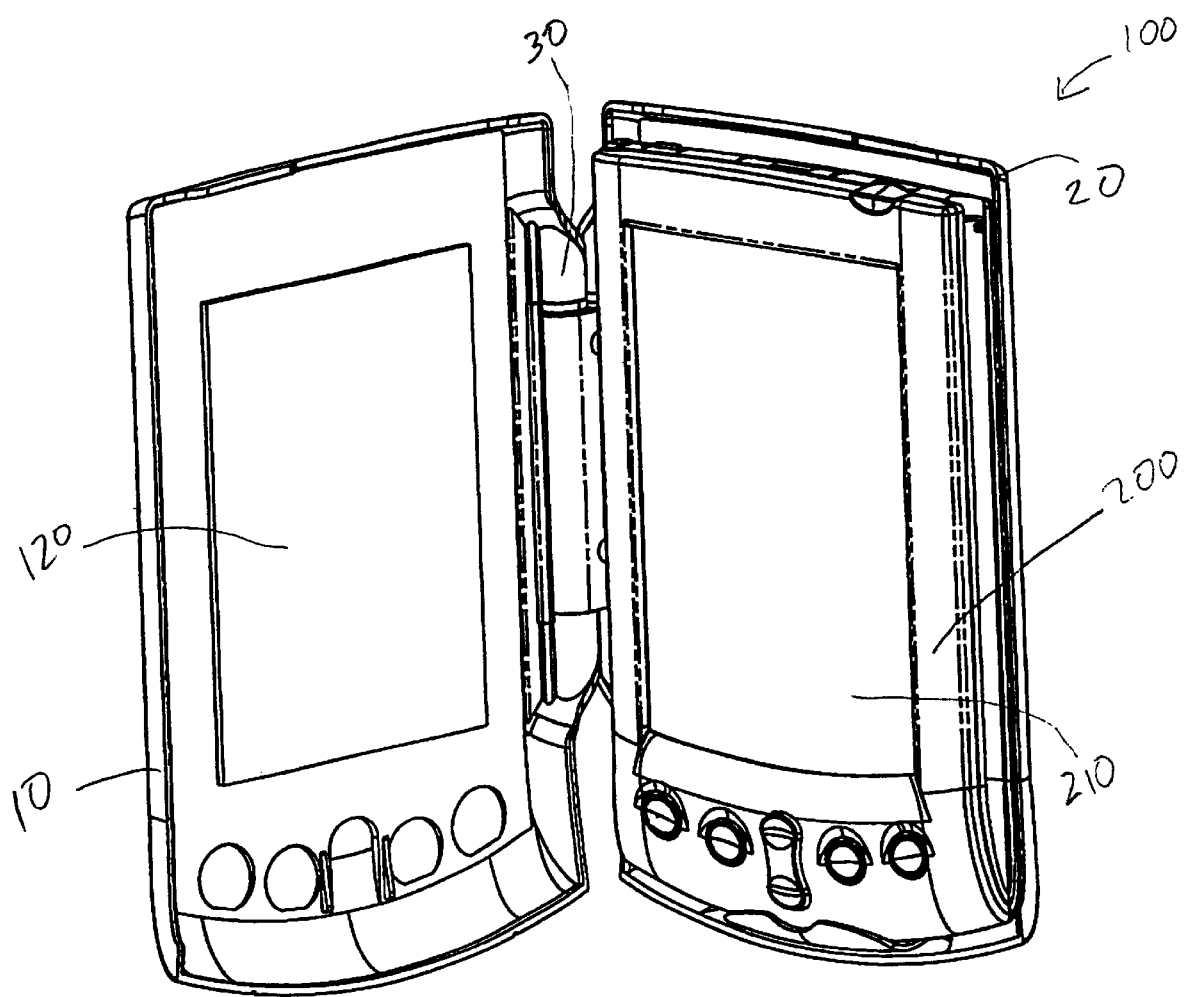
FIG. 4 illustrates a front view of a case in accordance with an embodiment of the present invention, showing the exemplary personal digital assistant of FIG. 3 inserted in the case.

FIG. 4 illustrates a front view of a case 100 in accordance with an embodiment of the present invention, showing the exemplary personal digital assistant 200 of FIG. 3 inserted in the case 100. The exemplary personal digital assistant 200 is coupled to the case 100 by sliding the stylus slot of the exemplary personal digital assistant 200 into the rod 60 (FIG. 2).

The front cover 10 is shaped and contoured to fit over the front of the exemplary personal digital assistant 200. The projecting center surface 120 of the front cover 10 rotates into the recess above the display device 210 when the case 100 is in a closed position. Additionally, the back cover 20 is shaped and contoured to fit over the rear of the exemplary personal digital assistant 200.

Figure 5:
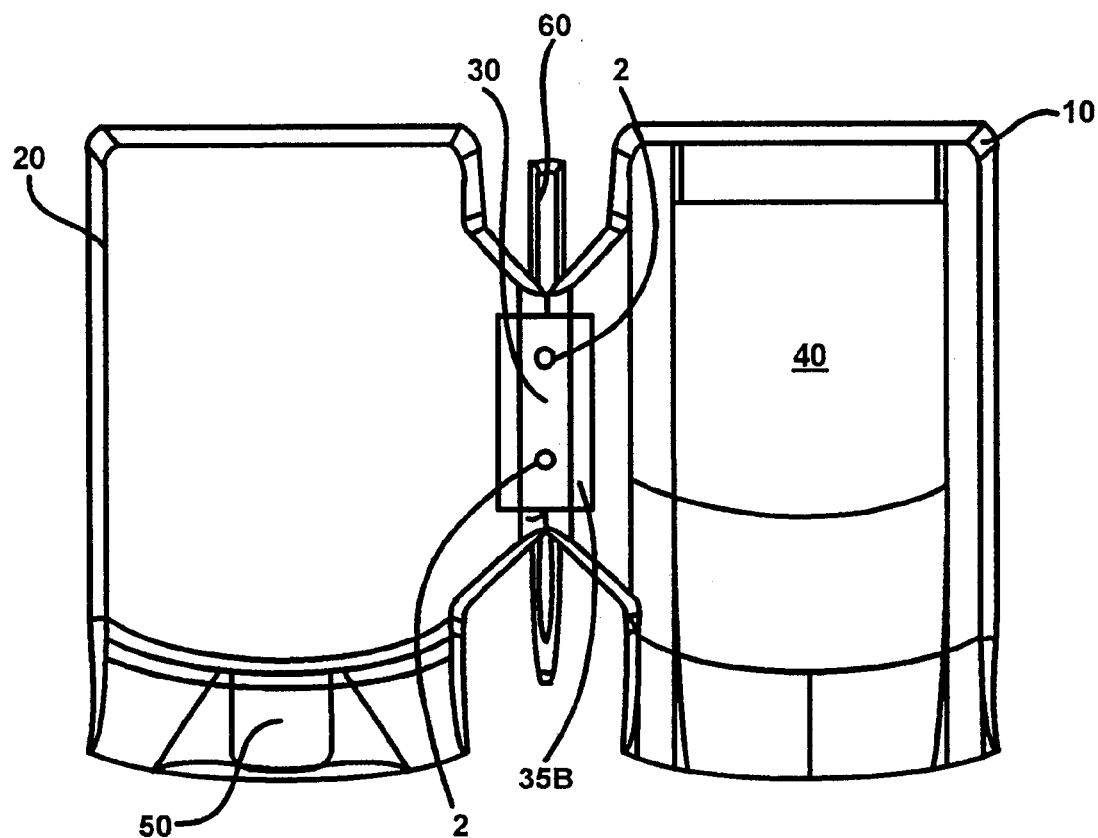
FIG. 5 illustrates a rear view of a case in accordance with an embodiment of the present invention, showing the case in an open position.
Figure 6:
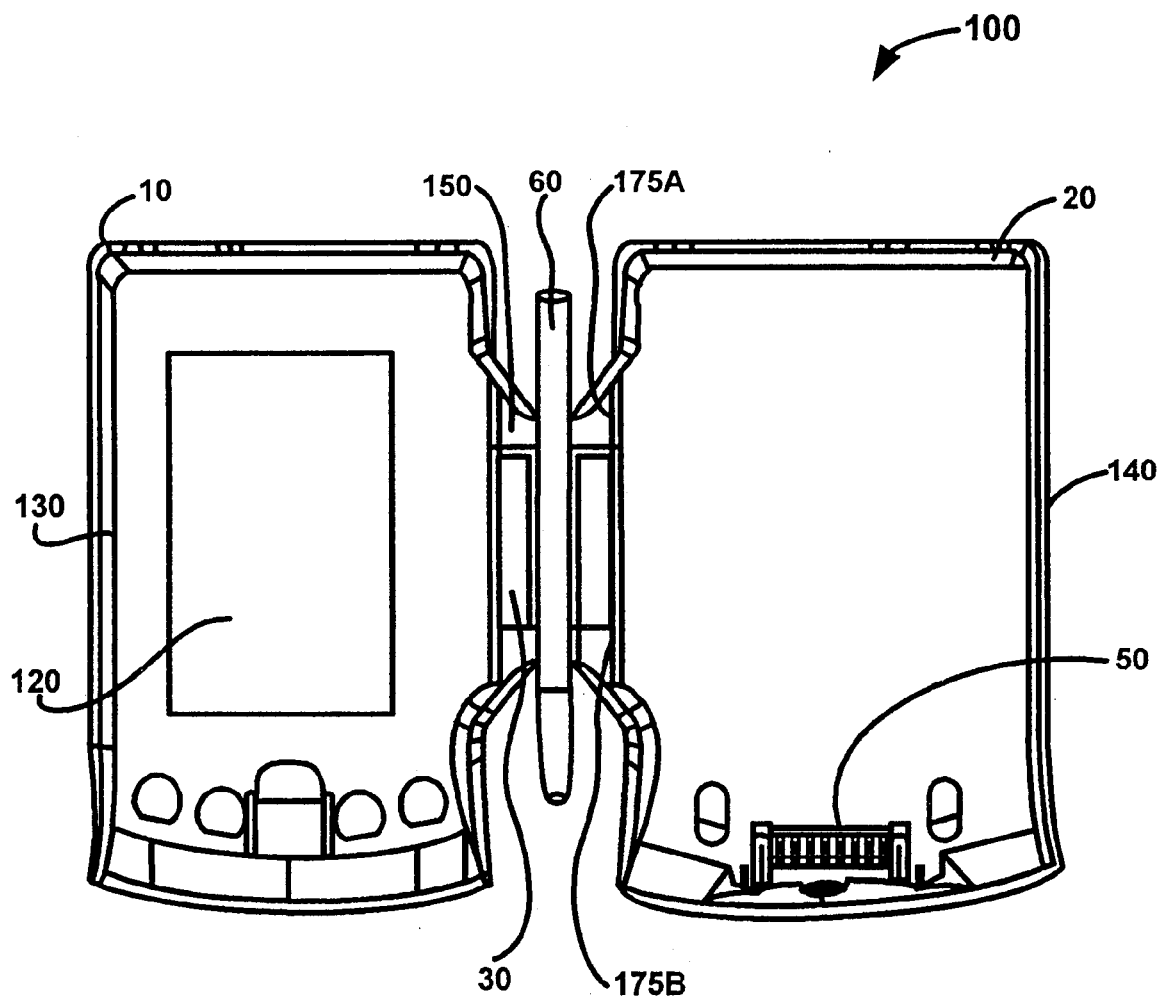
Figure 7:
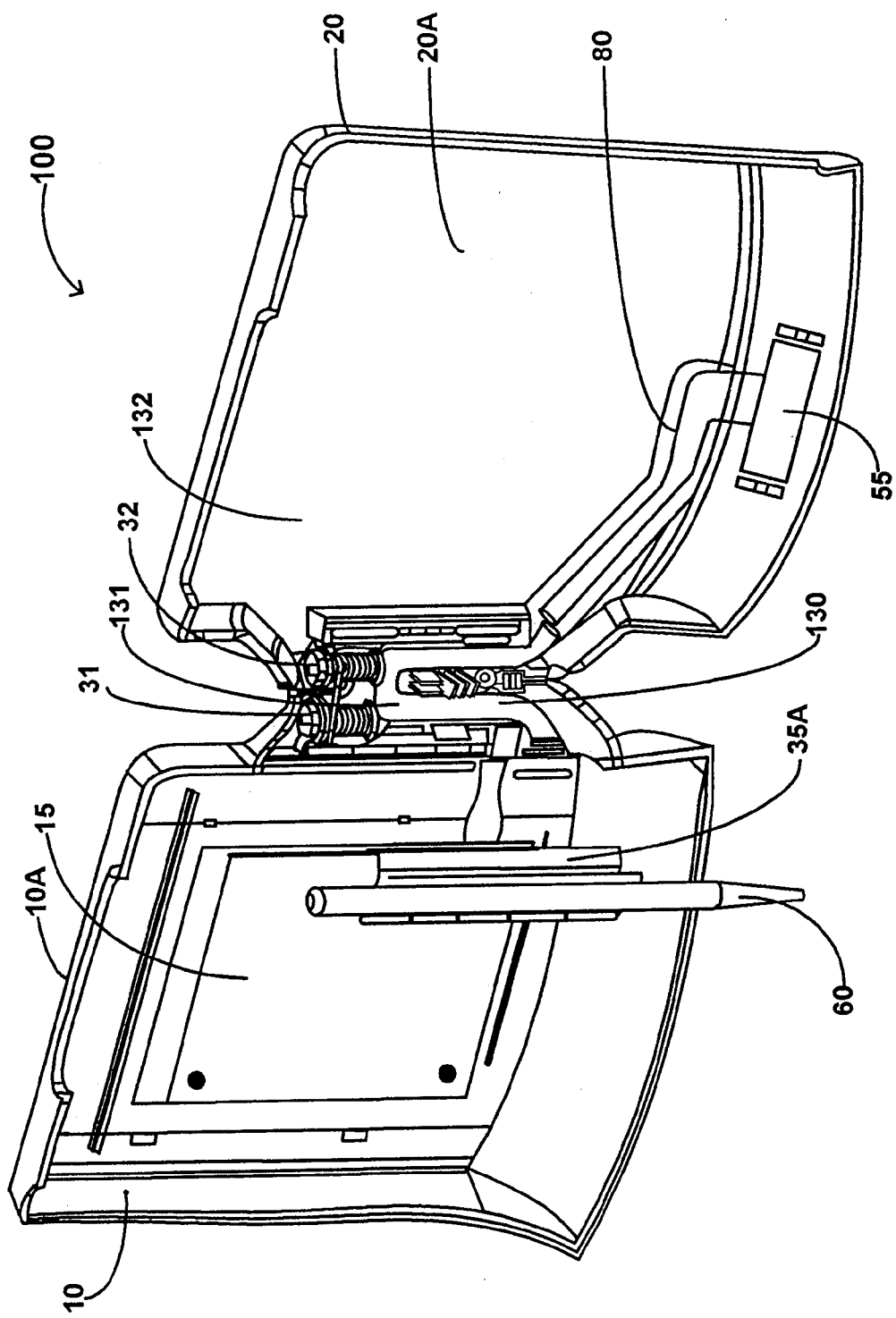
Figure 8:
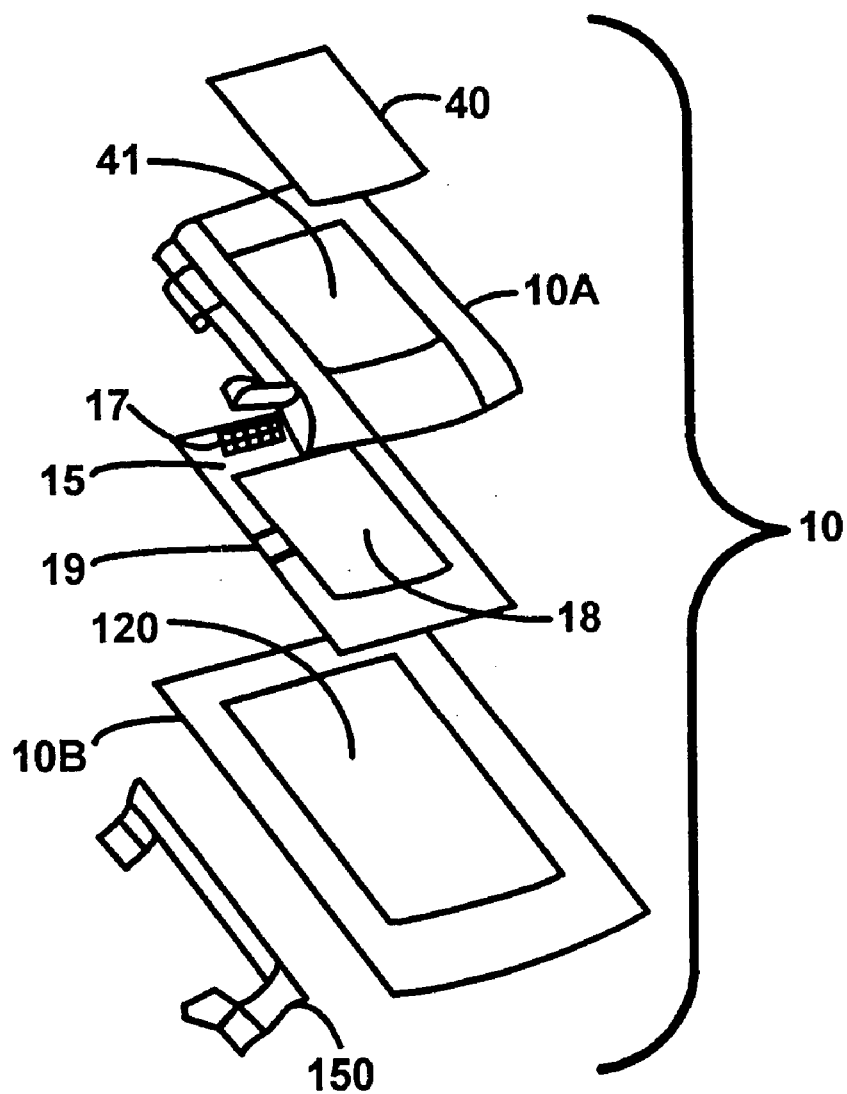
Figure 9:
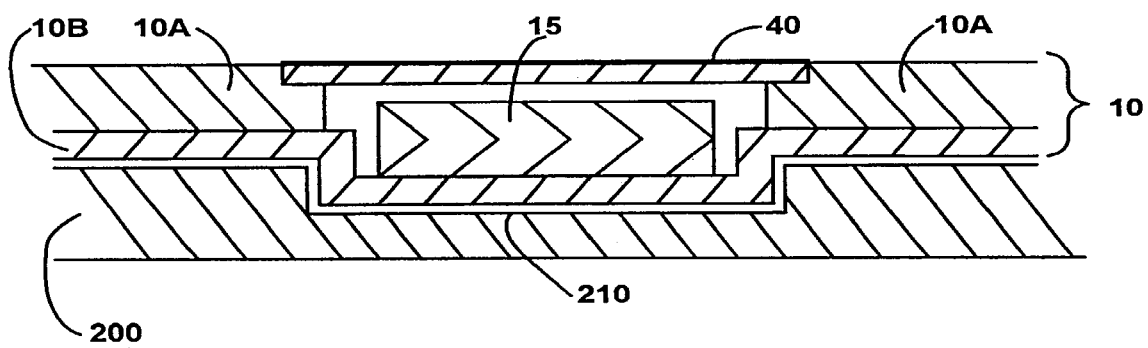
Figure 10:
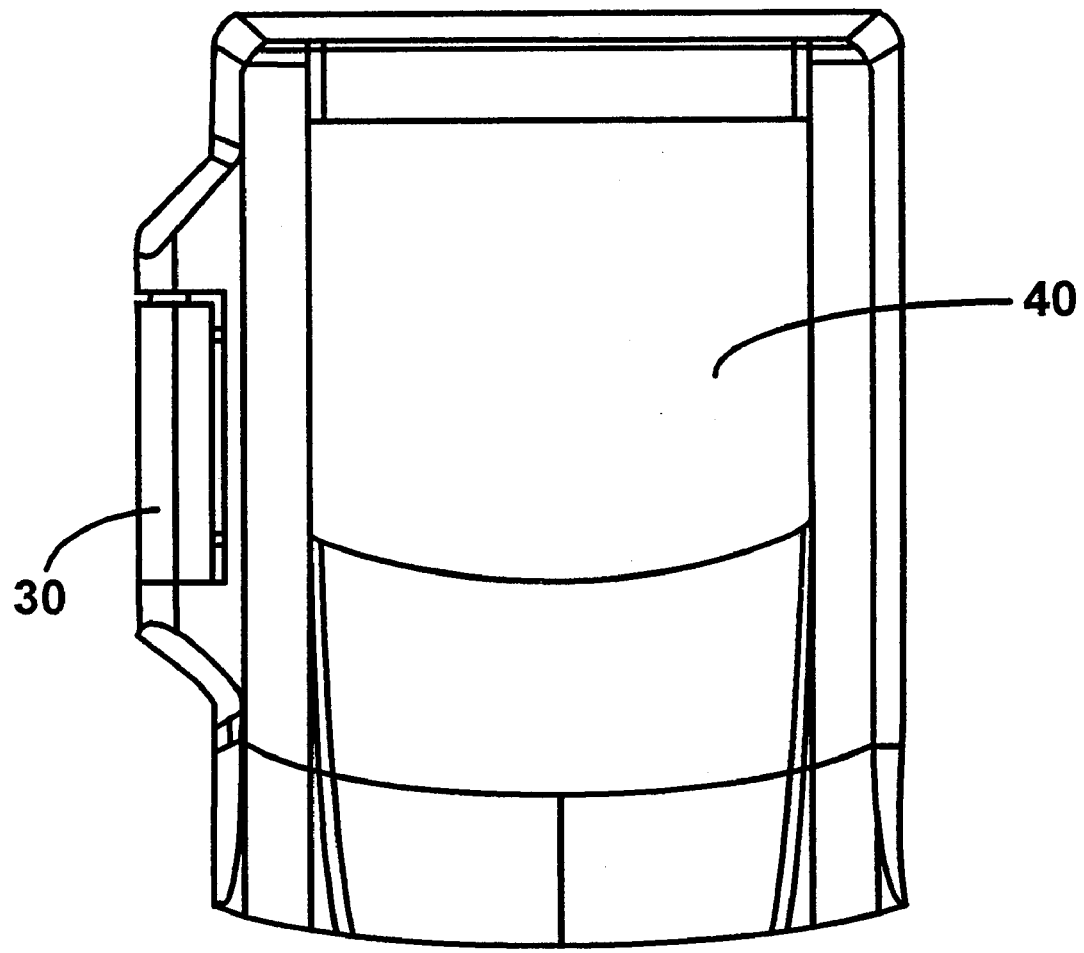
Figure 11:
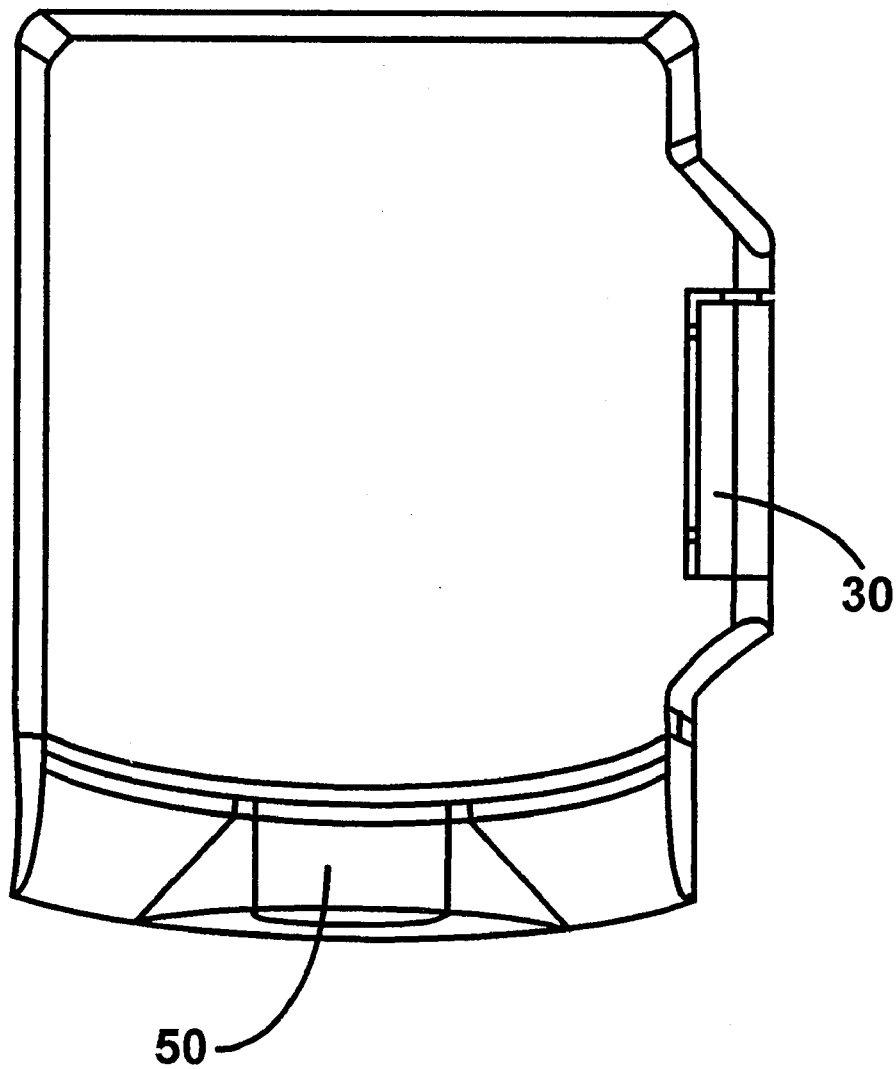
Figure 12:
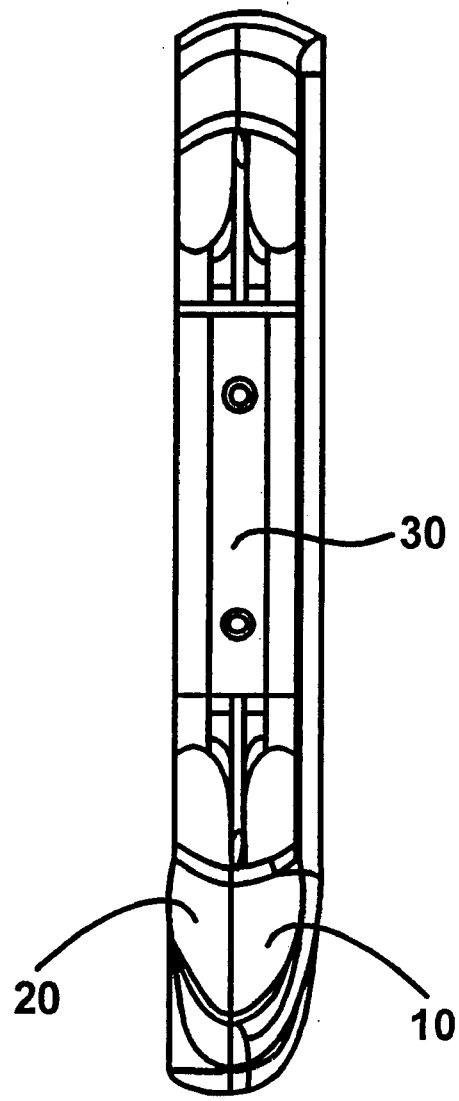
Figure 13:
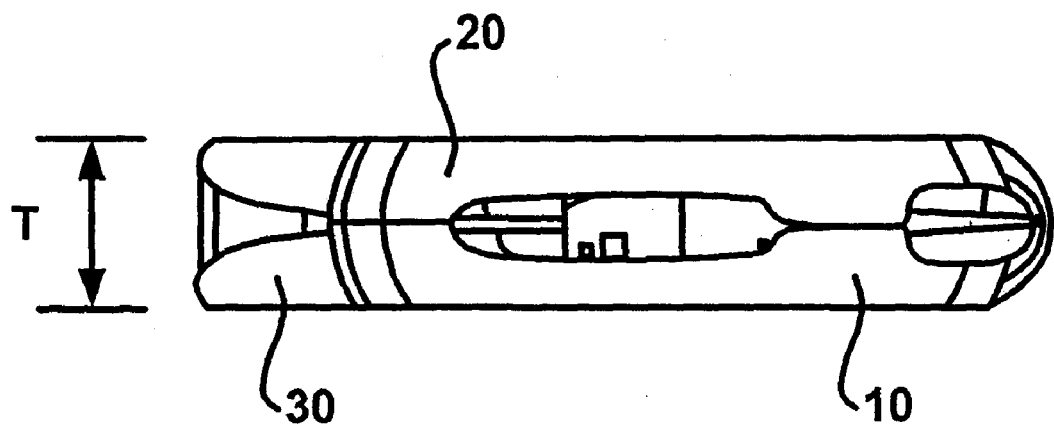
Figure 14:
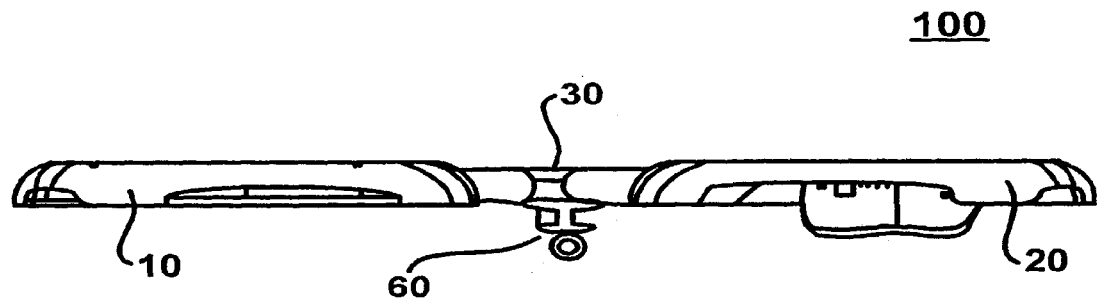
Figure 15:
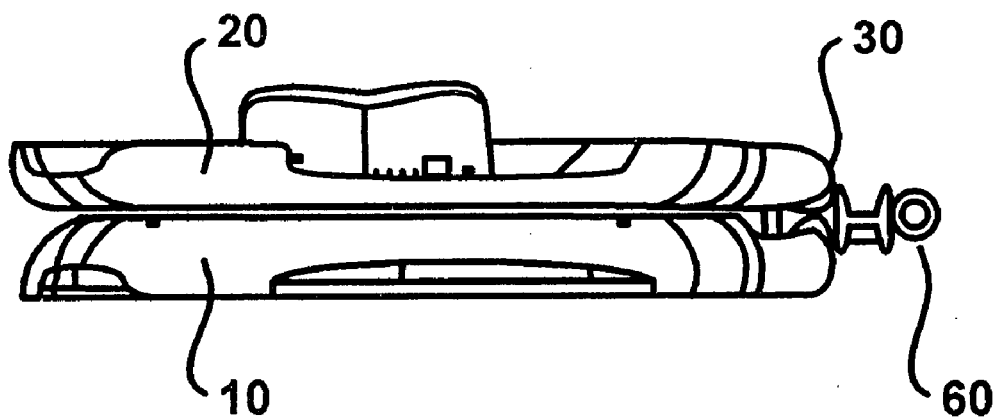
Figure 16:
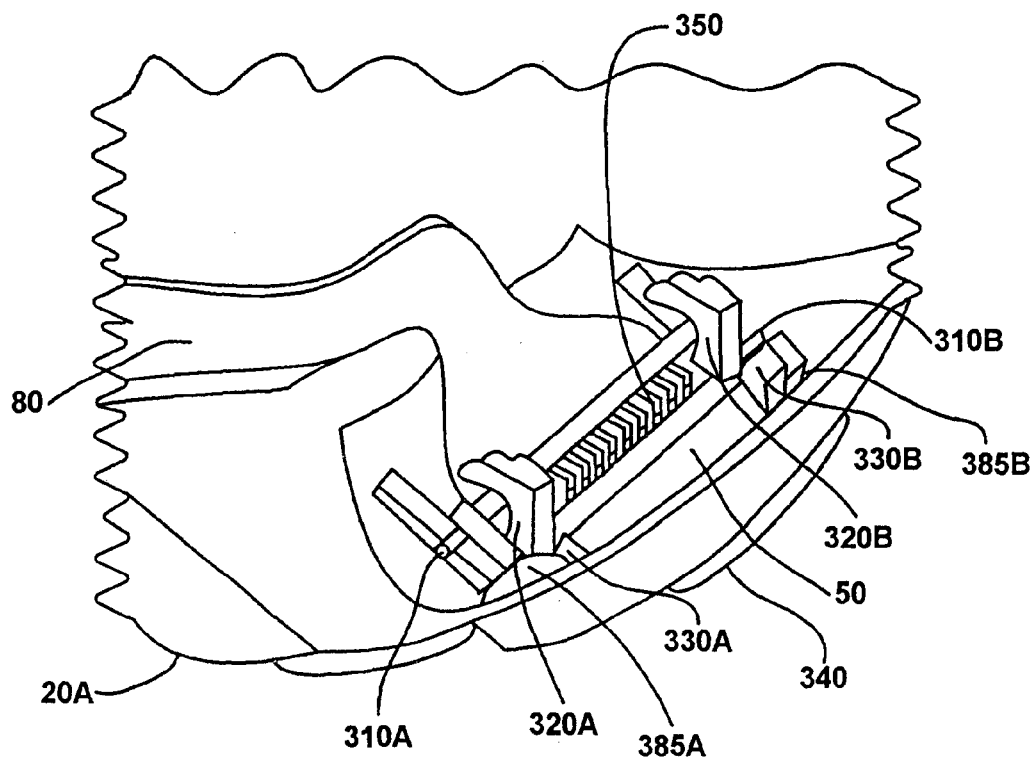
Figure 17:
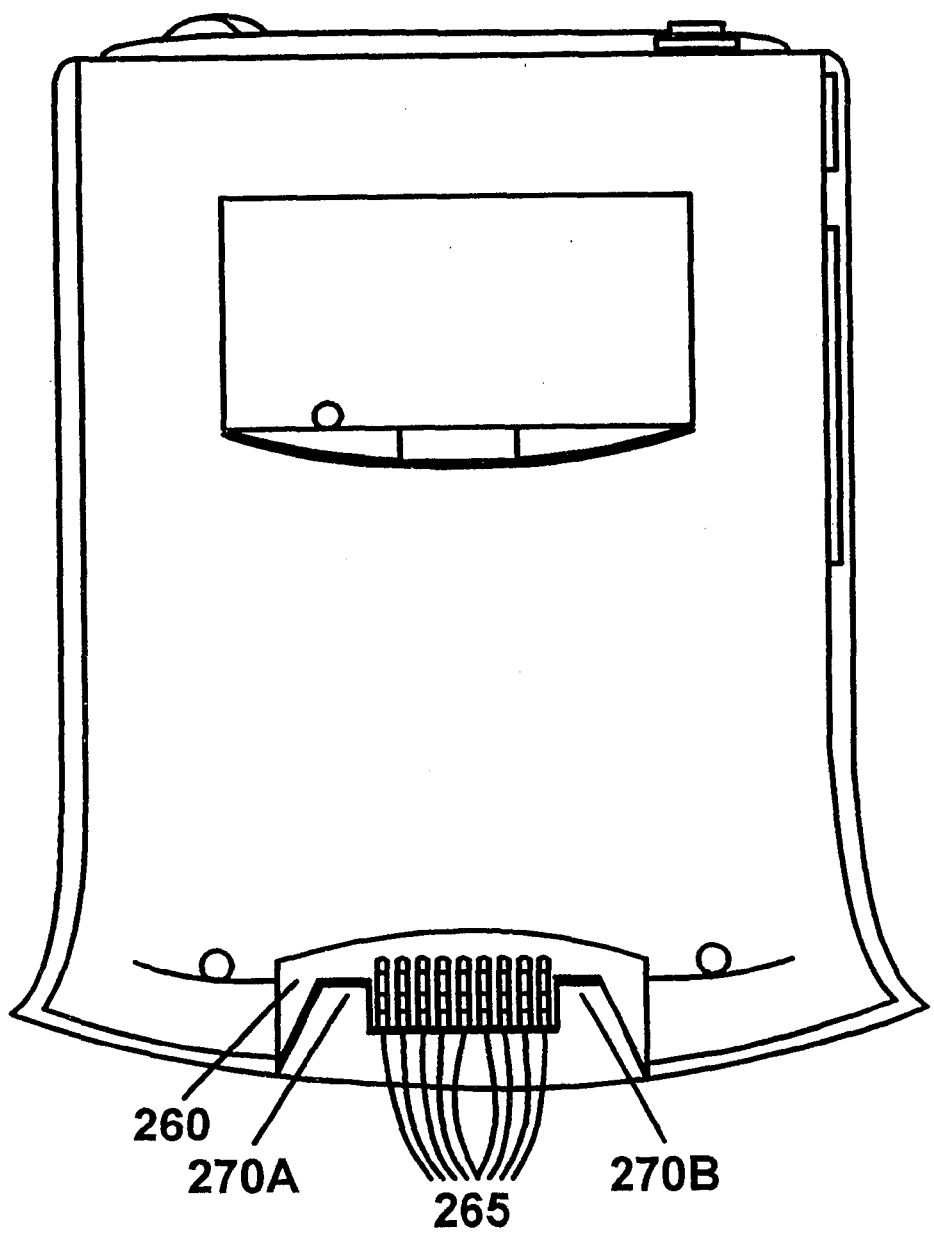
Figure 18:
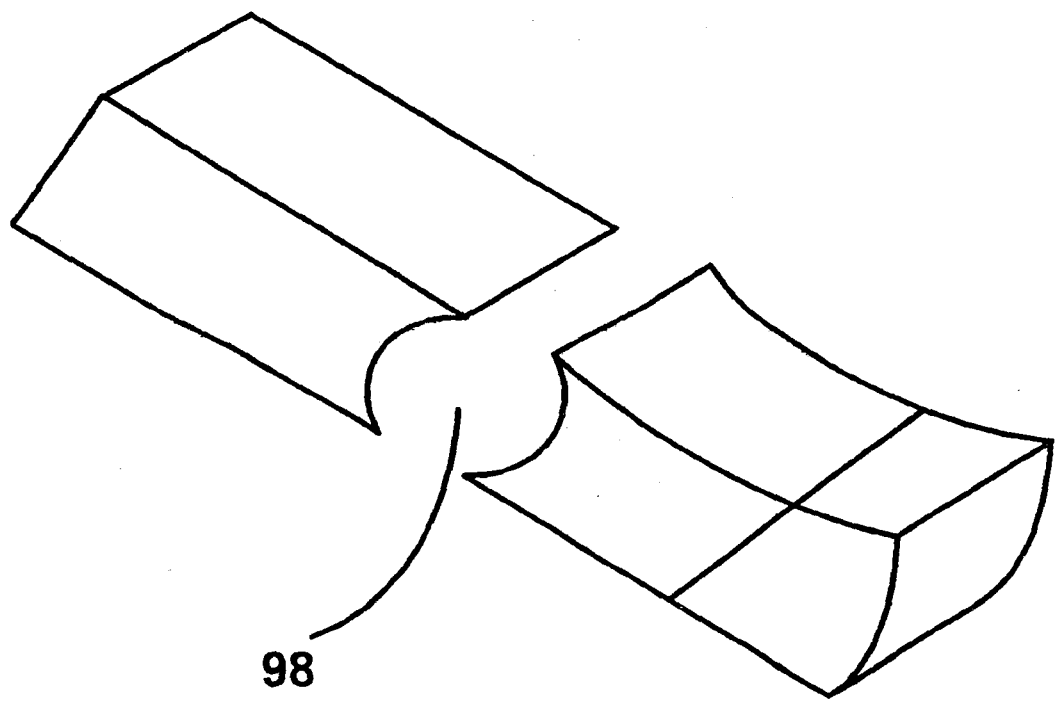
Figure 19:
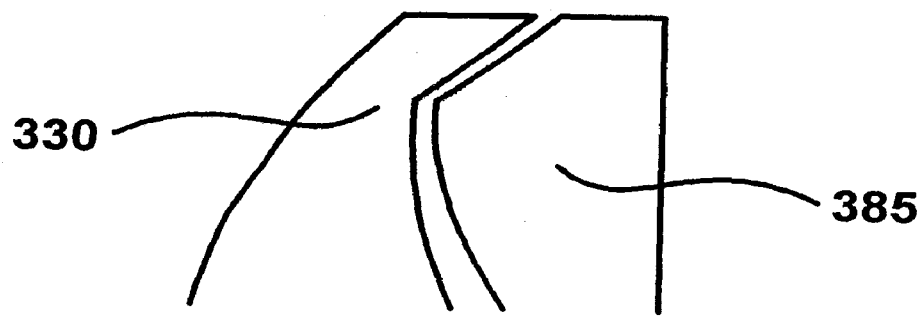

FIG. 5 illustrates a rear view of a case 100 in accordance with an embodiment of the present invention, showing the case 100 in an open position. The external surfaces of the front cover 10 and the back cover 20 are shown in FIG. 5. Here, the double pin hinge 30 allows the front cover 10 and the back cover 20 to form a 180 degree angle. As will be described below, the double pin hinge 30 allows the front cover 10 and the back cover 20 to form an angle between zero degrees and approximately 360 degrees.

The back cover 20 includes a rear view of the connector (described with respect to FIG. 2) which couples to the communication port of the personal digital assistant. As will be described below, the connector rotates about a pivot axis such that in a first position (illustrated in FIG. 5) the connector is flush with the external surface of the back cover 20 and in a second position the connector extends outwardly and forms an angle with the external surface of the back cover 20.

Figure 6:
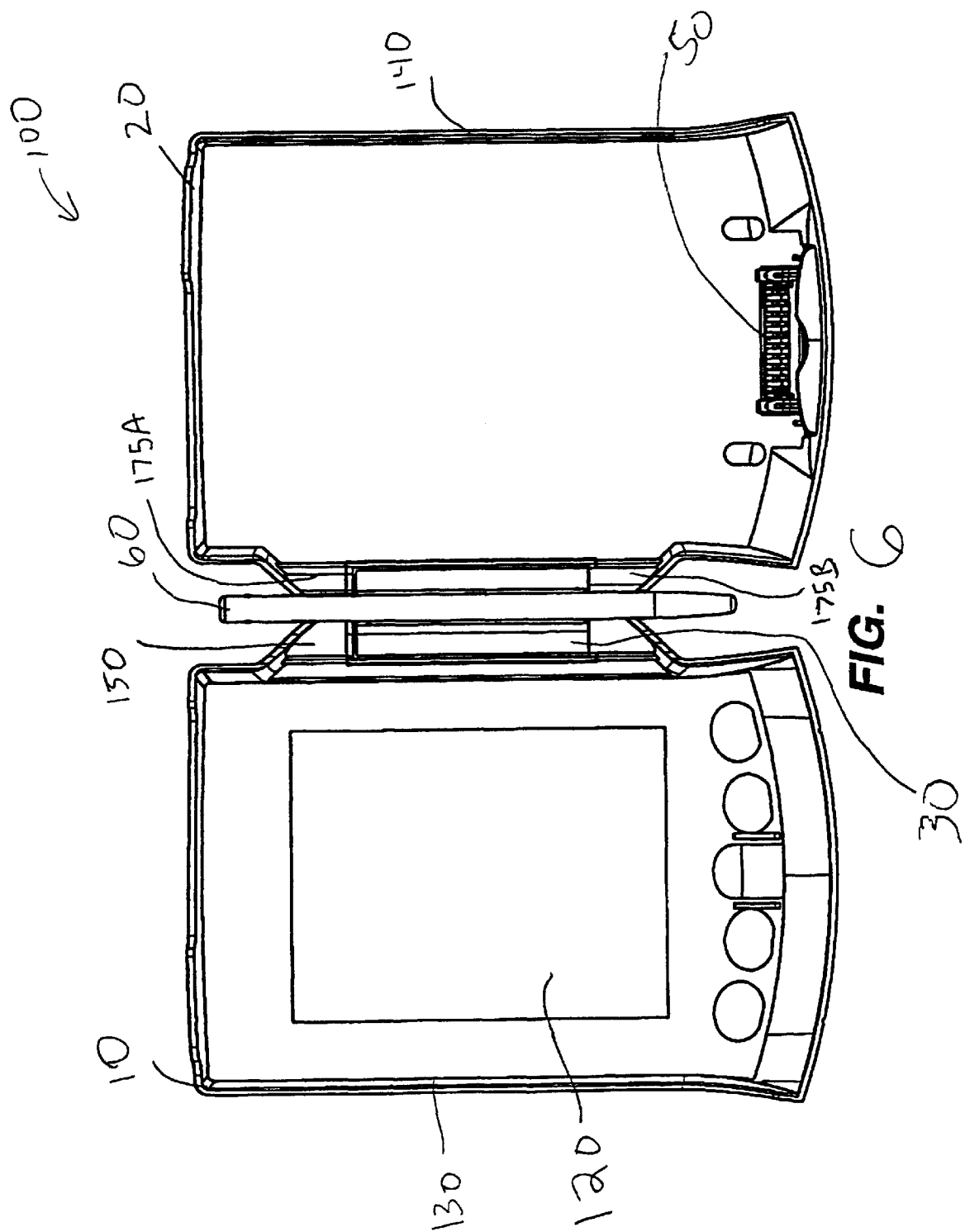
FIG. 6 illustrates a front view of a case in accordance with an embodiment of the present invention, showing the case in an open position.

FIG. 6 illustrates a front view of a case 100 in accordance with an embodiment of the present invention, showing the case 100 in an open position. In an embodiment, the front cover 10 and the back cover 20 are each comprised of a plastic material such as a polycarbonate and acrylonitrile-butadienestyrene (ABS) blend. In an embodiment, the front cover 10 includes an outer front cover and an inner front cover coupled to the outer front cover. The outer front cover and the inner front cover can be ultrasonically bonded together, whereas the communication module is placed between the outer front cover and the inner front cover before ultrasonic bonding. It should be understood that the outer front cover and the inner front cover can be coupled using any other method (e.g., heat, mechanical fasteners, adhesive, solvents, etc.). The section modulus of the front cover 10 is increased by the bonding interaction along the edge 130 between the outer front cover and the inner front cover that creates a truss-like transition. By increasing the section modulus, the stiffness of the front cover 10 is increased, reducing the required thickness of the outer front cover and the inner front cover.

In an embodiment, the back cover 20 includes an outer back cover and an inner back cover coupled to the outer front cover. The outer back cover and the inner back cover can be ultrasonically bonded together, whereas the connector 50 is placed between the outer back cover and the inner back cover before ultrasonic bonding. It should be understood that the outer cover and the inner back cover can be coupled using any other method (e.g., heat, mechanical fasteners, adhesive, solvents, etc.). The section modulus of the back cover 20 is increased by the bonding interaction along the edge 140 between the outer back cover and the inner back cover that creates a truss-like transition. By increasing the section modulus, the stiffness of the back cover 20 is increased, reducing the required thickness of the outer back cover and the inner back cover. The outer front cover and the outer back cover form the external surface of the case 100. The inner front cover and the inner back cover form the internal surface of the case 100.

In an embodiment, the front cover 10 includes a hinge cover 150 which covers a top portion and a bottom portion of a first pivot pin assembly of the double pin hinge 30. The back cover 20 includes a first hinge cover 175A and a second hinge cover 175B which are an integral part of the inner back cover, whereas the first and second hinge covers 175A and 175B cover a top portion and a bottom portion of a second pivot pin assembly of the double pin hinge 30. In an embodiment, the hinge covers 150, 175A and 175B are each comprised of a plastic material such as a polycarbonate and acrylonitrile-butadienestyrene (ABS) blend. The hinge cover 150 can be ultrasonically bonded to the inner front cover and to the outer front cover.

In an embodiment, the front cover 10 and the back cover 20 are formed using thin-wall molding technology. For example, the thickness of the outer front cover and the outer back cover can measure between approximately 1.1 mm and approximately 1.25 mm. Additionally, the thickness of the inner front cover and the inner back cover can measure between approximately 0.75 mm and approximately 1.00 mm.

Figure 7:
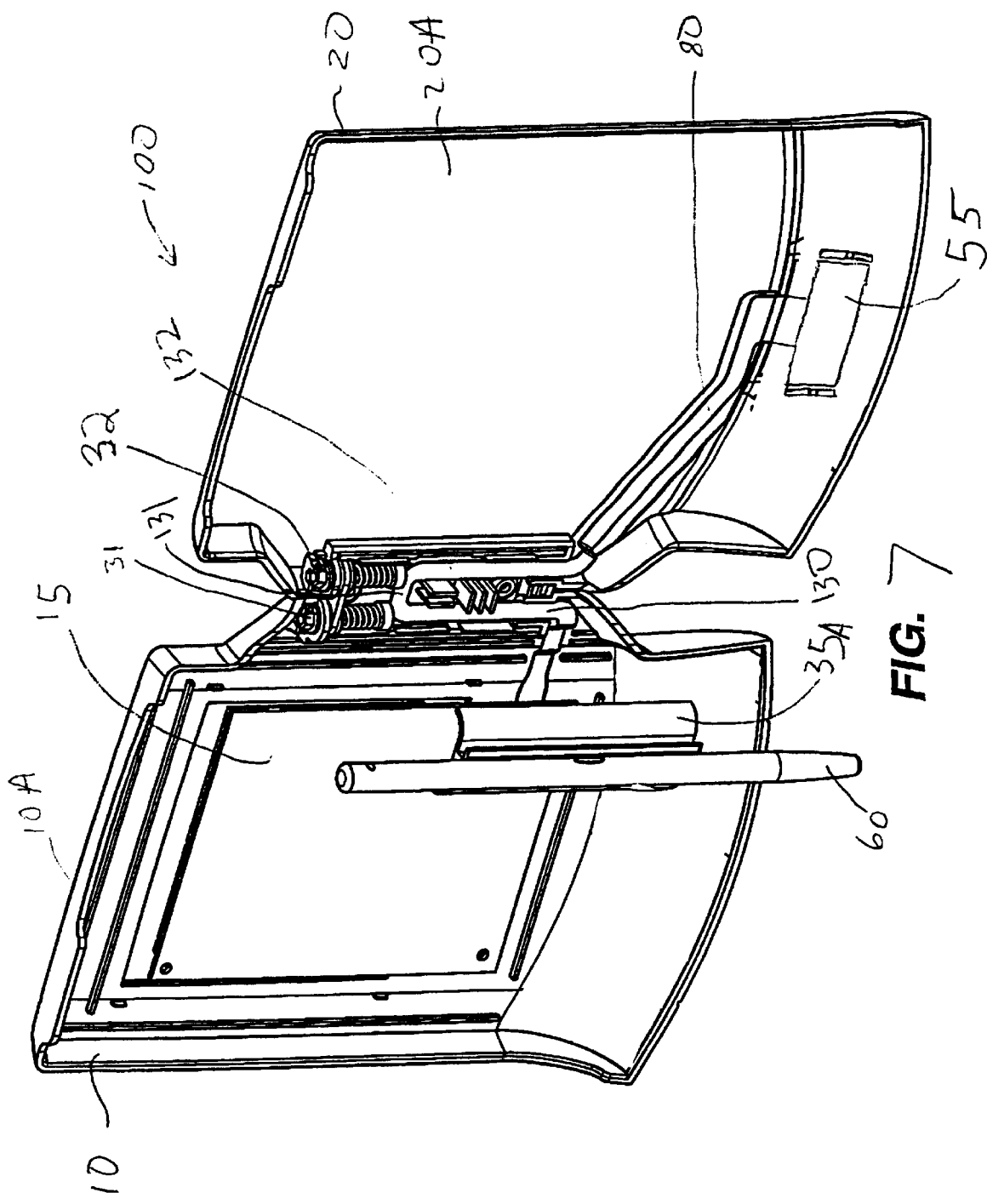
FIG. 7 illustrates a front perspective view of a case in accordance with an embodiment of the present invention, showing the case in an open position and showing the manner in which the electrical link is routed from the front cover to the back cover via the double pin hinge.

FIG. 7 illustrates a front perspective view of a case 100 in accordance with an embodiment of the present invention, showing the case 100 in an open position and showing the manner in which an electrical link 80 is routed from the front cover 10 to the back cover 20 via the double pin hinge. Here, the inner front cover and the inner back cover have been removed to illustrate the electrical link 80 and the communication module 15, whereas the inner front cover and the inner back cover protect the electrical link 80 and the communication module 15. As described above, a communication module 15 is integrated into the front cover 10, whereas FIG. 7 shows the rear of the communication module 15. The components of the communication module 15 are located on the side of the communication module 15 that faces the outer front cover 10A.

Referring to FIG. 7, the case 100 includes a double pin hinge assembly having a first pivot pin assembly 31 coupled to the front cover 10 and a second pivot pin assembly 32 coupled to the back cover 20. The double pin hinge is superior to the single pin hinge utilized in the conventional case of the prior art because the single pin hinge exhibits wear and consequent change in performance over many cycles of use. Moreover, the double pin hinge allows the front cover 10 and the back cover 20 greater rotational freedom than the single pin hinge of the conventional case of the prior art, permitting the front cover 10 and the back cover 20 to rotate to a generally back-to-back position and to rotate to a generally front-to-front position (as illustrated in FIG. 1). Additionally, it is difficult to route the electrical link 80 through a single pin hinge.

In an embodiment, the double pin hinge allows the front cover 10 and the back cover 20 to independently rotate relative to one another. In particular, the front cover 10 and the back cover 20 can each rotate approximately 180 degrees, enabling the generally back-to-back position. Since the front cover 10 and the back cover 20 can be rotated to the generally back-to-back position, the personal digital assistant can be positioned in a conventional cradle (as described above) which facilitates synchronizing the data of the personal digital assistant with the data of a personal computer system and which facilitates recharging the batteries of the personal digital assistant, without separating the personal digital assistant from the case 100 (i.e., removing the personal digital assistant from the rod 60).

In an embodiment, the double pin hinge includes a friction system that holds the front cover 10 and the back cover 20 in different positions as they are rotated. In an embodiment, the double pin hinge includes a housing having a first portion 35A and a second portion 35B (see FIG. 5), whereas the rod 60 is coupled to the first portion 35A. In an embodiment, the first portion 35A and the second portion 35B (see FIG. 5) of the double pin hinge housing are each comprised of a plastic material such as a polycarbonate and acrylonitrile-butadienestyrene (ABS) blend. The first portion 35A and the second portion 35B (see FIG. 5) of the double pin hinge housing can be ultrasonically bonded together. Additionally, the first portion 35A and the second portion 35B (see FIG. 5) of the double pin hinge housing can be coupled with one or more screws 2 (see FIG. 5).

In an embodiment, the electrical link 80 includes a first end that is coupled to the communication module 15 via a zero insertion force (ZIF) connector (not shown) located on the communication module 15. Additionally, the electrical link 80 includes a second end that is coupled to the connector 50 (see FIG. 6) which couples to the opening 55 in the outer back cover 20A. The double pin hinge facilitates routing the electrical link 80 between the communication module 15 positioned in the front cover 10 and the connector 50 (see FIG. 6) positioned in the back cover 20. In particular, the double pin hinge allows the electrical link 80 to pass through from the outer front cover 10A to the outer back cover 20A while allowing the front cover 10 and the back cover 20 to rotate to form angles between zero degrees and approximately 360 degrees. As illustrated, the electrical link 80 is routed from the outer front cover 10A through a first pivot pin channel 130 of the double pin hinge assembly, a cavity 131 in the double pin hinge assembly, and a second pivot pin channel 132 of the double pin hinge assembly and to the outer back cover 20A.

When either the front cover 10 or the back cover 20 is rotated, the electrical link 80 experiences a torsional twist in the portion of the electrical link 80 routed through the cavity 131 in the double pin hinge assembly. In the open position illustrated in FIG. 7, the electrical link 80 experiences no torsional twist. In the closed position illustrated in FIG. 1, the electrical link 80 is rotated about the cavity 131 approximately 90 degrees by the front cover 10 and the back cover 20. In the fully open position (i.e., when the front cover 10 and the back cover 20 are generally back-to-back or form an angle which is approximately 360 degrees), the electrical link 80 is rotated about the cavity 131 approximately 90 degrees by the front cover 10 and the back cover 20. The electrical link 80 can comprise a flex circuit, a flat flexible cable, a flexible printed circuit, or any other type of flexible circuitry.

Figure 8:
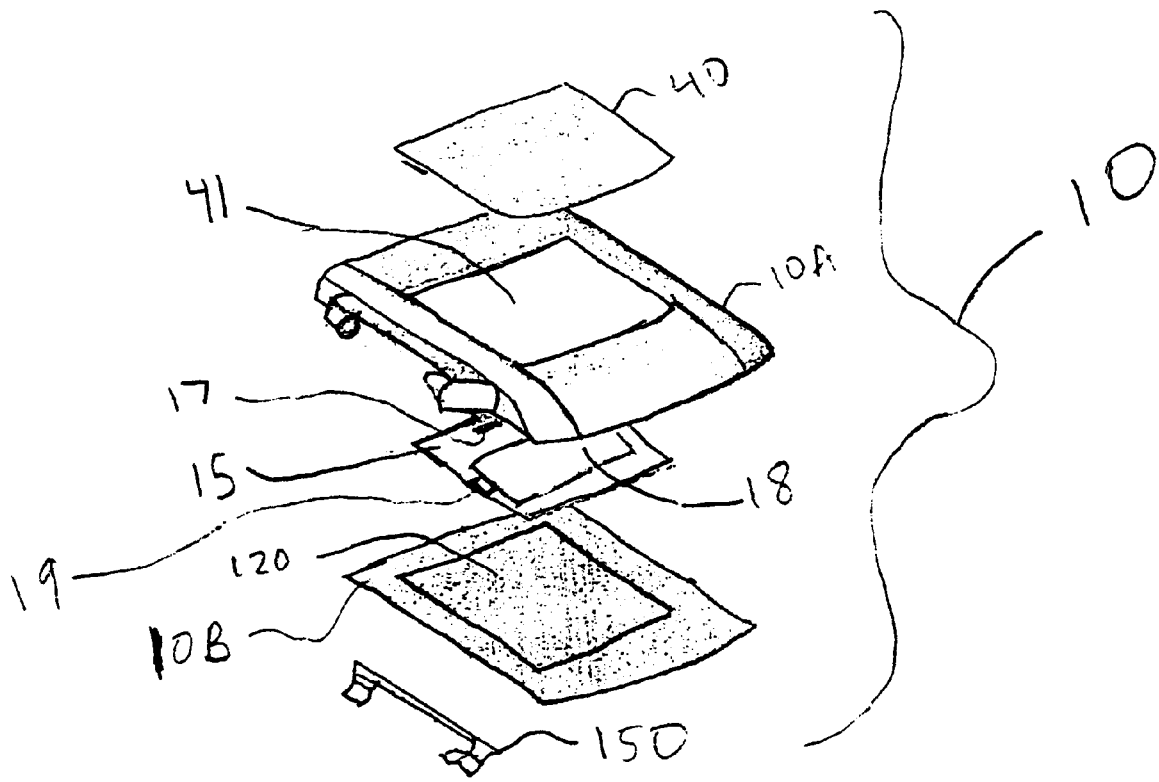
FIG. 8 illustrates an exploded view of a front cover of a case in accordance with an embodiment of the present invention.

FIG. 8 illustrates an exploded view of a front cover 10 of a case 100 in accordance with an embodiment of the present invention. The front cover 10 includes an outer front cover 10A, a communication module 15, an inner front cover 10B, and a hinge cover 150. The outer front cover 10A has an opening or window 41. In an embodiment, a metal plate 40 is coupled to the opening 41 of the outer front cover 10A. The metal cover 40 can be coupled to the opening 41 by approaching from above the outer front cover 10A or from below the outer front cover 10A.

In an embodiment, the metal plate 40 has a thickness that is smaller than the thickness of the outer front cover 10A. For example, the thickness of the metal plate 40 can be 0.25 mm while the thickness of the outer front cover 10A can measure between approximately 1.1 mm and approximately 1.25 mm. Thus, the metal plate 40 reduces the stack thickness of the combination of the metal plate 40, the outer front cover 10A, the communication module 15, and the inner front cover 10B. The communication module 15 is positioned between the metal plate 40 and the recess 120 of the inner front cover 10B, whereas the metal plate 40 protects the communication module 15 from damage. The recess 120 occupies a space or recess above the display device of the personal digital assistant inserted into the case 100 so that to provide additional space for integrating the communication module 15 into the front cover 10.

Moreover, the metal plate 40 is comprised of metals such as aircraft quality aluminum, 300 series stainless steel, or a clad-type material (e.g., nickel bonded to a carbon steel, aluminum bonded to a carbon steel, etc.). Metals that are corrosion resistant, have stiffness, can be decorated, and are good conductors are appropriate for the metal plate 40. The metal plate 40 provides a style opportunity, allows embossment of a logo, and can be grounded to protect the communication module 15 from electromagnetic interference and radio frequency interference.

The metal plate 40 can be coupled to the outer front cover 10A using a variety of methods. For example, the metal plate 40 can be coupled with mechanical fasteners, adhesive (e.g., pressure sensitive adhesive, hot melt adhesive, etc.), ultrasonic bonding, heat bonding, or can be insert-molded into the outer front cover 10A.

In an embodiment, the communication module 15 comprises a printed circuit board having an antenna 17 for radiating energy, circuitry 18 for transmitting and receiving data via a wireless link for the personal digital assistant, and a zero insertion force connector 19 for coupling to the electrical link 80 (see FIG. 7). In an embodiment, the wireless link comprises a radio frequency (RF) wireless link. In an embodiment, the communication module 15 comprises a Bluetooth radio system. The communication module 15 allows implementing a wireless interface for synchronizing the personal digital assistant with a personal computer system or interacting with a wireless network or any wireless application.

Referring again to FIG. 8, the antenna 17 comprises a chip antenna or driven radiating element. The antenna 17 can be any number of configurations, such an inverted F, Folded Dipole, J-Type, or other configurations.

Besides protecting the communication module 15 and reducing the stack thickness, the metal plate 40 also functions as a passive radiator 40. In an embodiment, the passive radiator 40 and the antenna 17 form an antenna system. the antenna system can include a counterpoise (not shown) arranged on the communication module 15. The counterpoise can be a ground plane. The antenna 17 is positioned under the passive radiator 40. In an embodiment, the passive radiator 40 has a generally rectangular shape.

The performance of the antenna system is optimized by the appropriate selection of the length and width of the passive radiator 40. The radiation pattern of the antenna system is dependent on the length and width of the passive radiator 40. The gain of the antenna system is dependent on the length and width of the passive radiator 40. The bandwidth of the antenna system is dependent on the length and width of the passive radiator 40. Moreover, the length and width of the passive radiator 40 can be selected such that to optimize the radiation pattern of the antenna system in a desired direction. Hence, the negative effects of the human body on the radiation pattern can be reduced by selecting an appropriate width and length for the passive radiator 40. Therefore, the antenna 17 does not have to be placed outside the case 100, minimizing the form-factor of the case 100.

In an embodiment, the length of the passive radiator 40 is approximately one-quarter of a radiating wavelength of the antenna system, whereas the radiating wavelength is determined based on a radiating frequency of the antenna system. Additionally, the width of the passive radiator 40 is approximately one-quarter of a radiating wavelength of the antenna system, whereas the radiating wavelength is determined based on a radiating frequency of the antenna system.

In an embodiment, the length of the passive radiator 40 is approximately one-half of a radiating wavelength of the. antenna system, whereas the radiating wavelength is determined based on a radiating frequency of the antenna system. Additionally, the width of the passive radiator 40 is approximately one-half of a radiating wavelength of the antenna system, whereas the radiating wavelength is determined based on a radiating frequency of the antenna system.

In an embodiment, the radiation pattern of the antenna system is dependent on a separation between the passive radiator 40 and the antenna 17, whereas a minimum separation enhances the radiation pattern. In an embodiment, the radiation pattern of the antenna system is dependent on a separation between the passive radiator 40 and the counterpoise (not shown) of the communication module 15, whereas a minimum separation enhances the radiation pattern. In an embodiment, the radiation pattern of the antenna system is dependent on the width and length of the counterpoise (not shown).

In practice, a portion of the energy from the antenna 17 is coupled to the passive radiator 40 via radiation, induction, or capacitance to form coupled energy. The passive radiator 40 radiates the coupled energy. Due to power efficiency constraints some of the coupled energy is lost rather than radiated.

Figure 9:
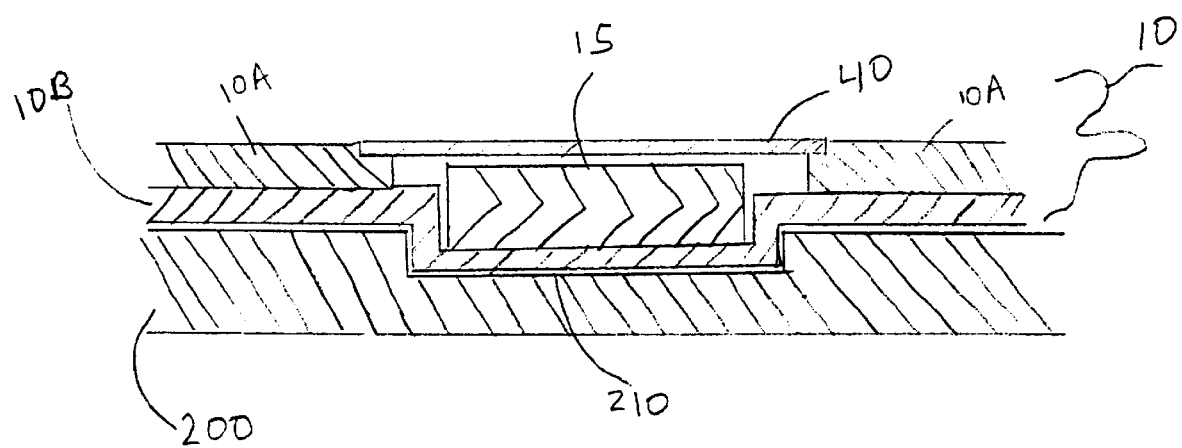
FIG. 9 illustrates a cross-sectional view of a front cover of a case in accordance with an embodiment of the present invention.

FIG. 9 illustrates a cross-sectional view of a front cover 10 of a case 100 in accordance with an embodiment of the present invention. The metal plate 40 is coupled to the outer front cover 10A, whereas the metal cover 40 has a thickness that is smaller than the thickness of the outer front cover 10A. The communication module 15 is positioned between the metal plate 40 and the recess of the inner front plate 10B. The recess of the inner front plate 10B occupies a recess that is above the display device 210 of the exemplary personal digital assistant 200.

Figure 10:
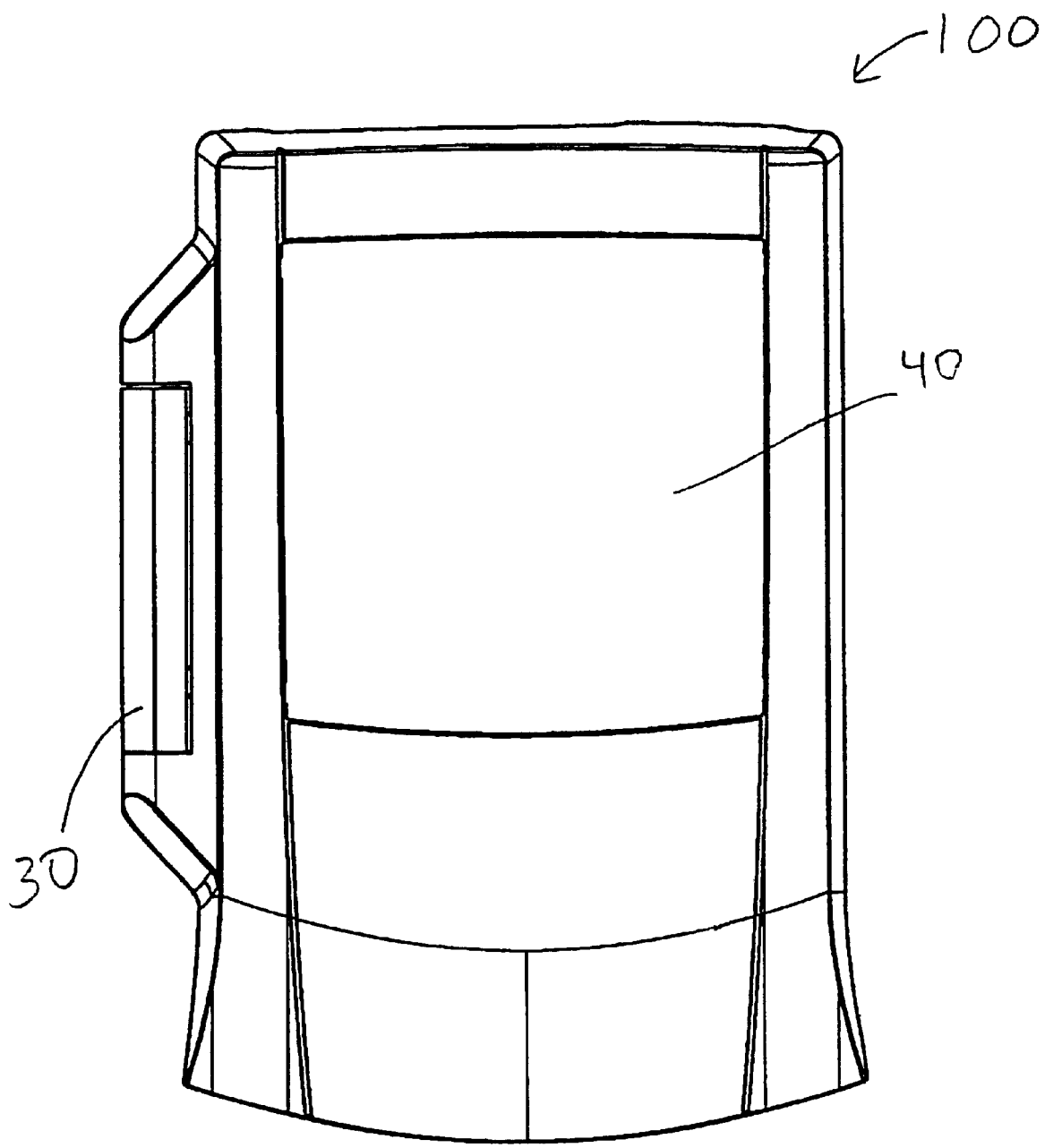
FIG. 10 illustrates a front view of a case in accordance with an embodiment of the present invention, showing the case in a closed position.

FIG. 10 illustrates a front view of a case 100 in accordance with an embodiment of the present invention, showing the case 100 in a closed position.

Figure 11:
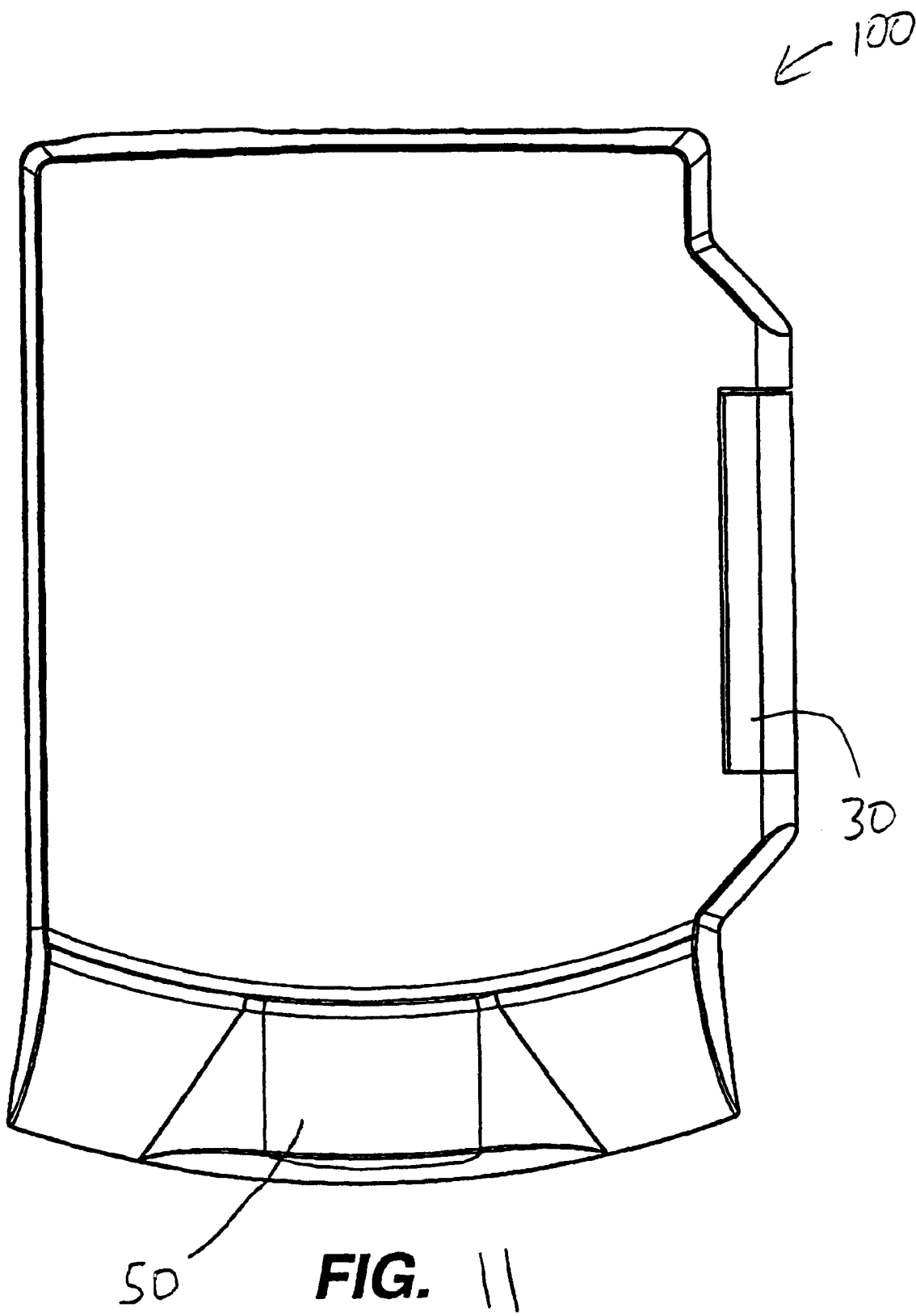
FIG. 11 illustrates a rear view of a case in accordance with an embodiment of the present invention, showing the case in a closed position.

FIG. 11 illustrates a rear view of a case 100 in accordance with an embodiment of the present invention, showing the case 100 in a closed position.

Figure 12:
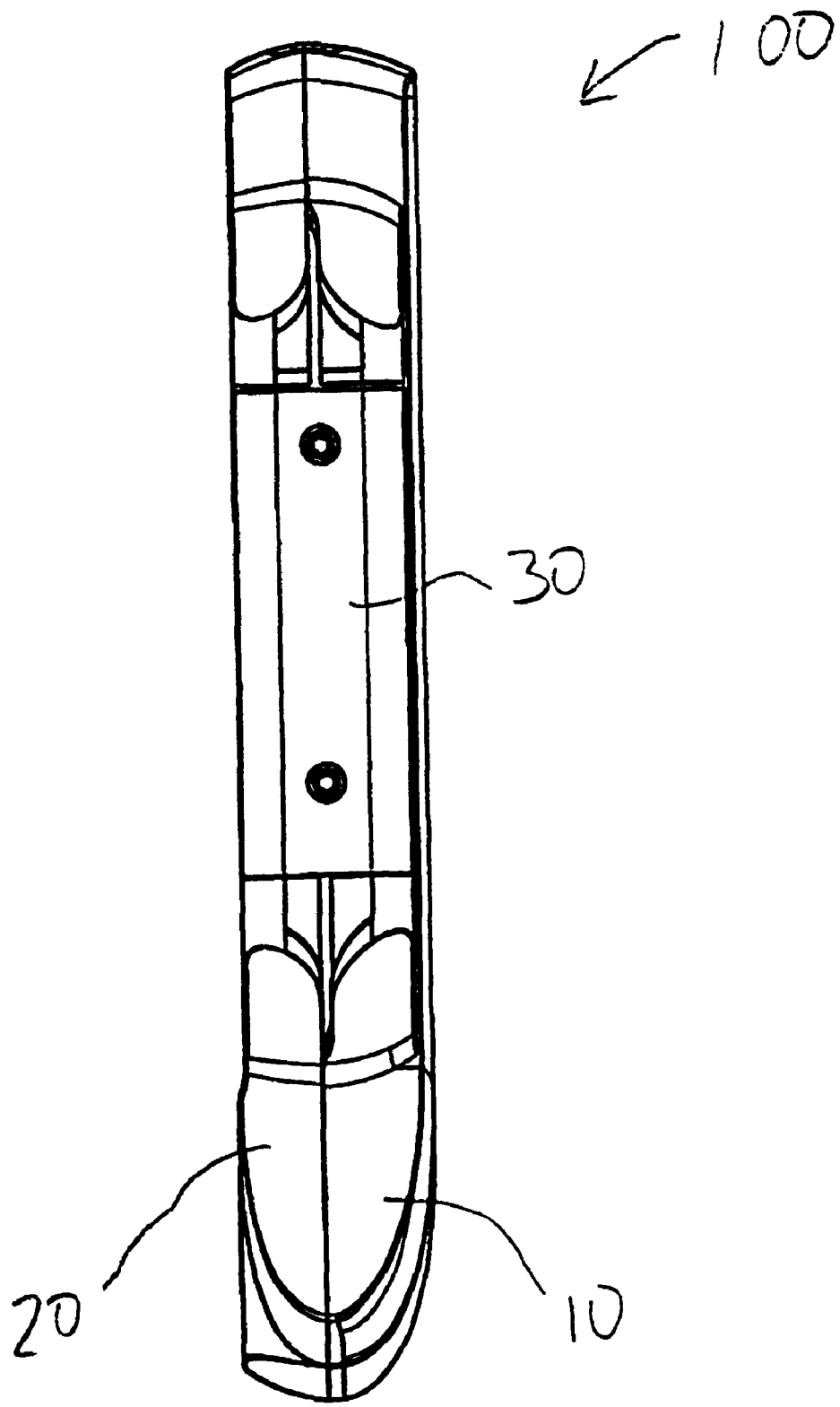
FIG. 12 illustrates a left side view of a case in accordance with an embodiment of the present invention, showing the case in a closed position.

FIG. 12 illustrates a left side view of a case 100 in accordance with an embodiment of the present invention, showing the case 100 in a closed position.

Figure 13:
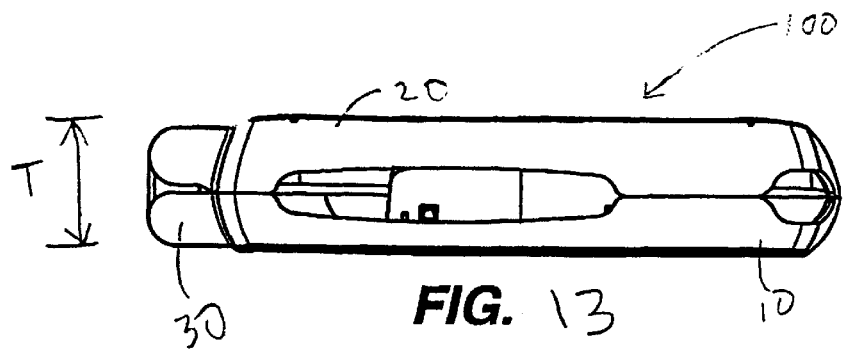
FIG. 13 illustrates a top view of a case in accordance with an embodiment of the present invention, showing the case in a closed position.

FIG. 13 illustrates a top view of a case 100 in accordance with an embodiment of the present invention, showing the case 100 in a closed position. In an embodiment, the thickness T of the case 100 measures approximately 0.719 inches.

Figure 14:
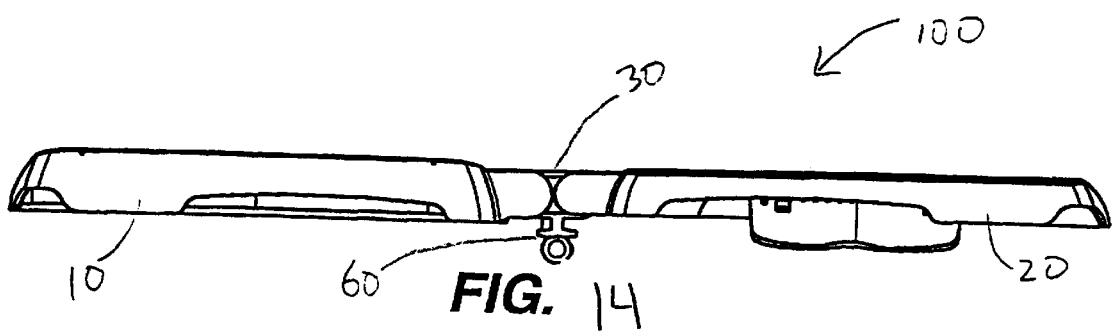
FIG. 14 illustrates a top view of a case in accordance with an embodiment of the present invention, showing the case in an open position.

FIG. 14 illustrates a top view of a case 100 in accordance with an embodiment of the present invention, showing the case 100 in an open position.

Figure 15:
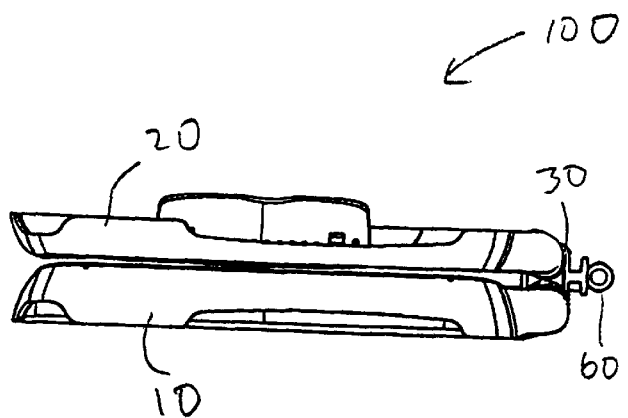
FIG. 15 illustrates a top view of a case in accordance with an embodiment of the present invention, showing the case in a fully open position.

FIG. 15 illustrates a top view of a case 100 in accordance with an embodiment of the present invention, showing the case 100 in a fully open position or showing the front cover 10 and the back cover 20 in a generally back-to-back position.

Figure 16:
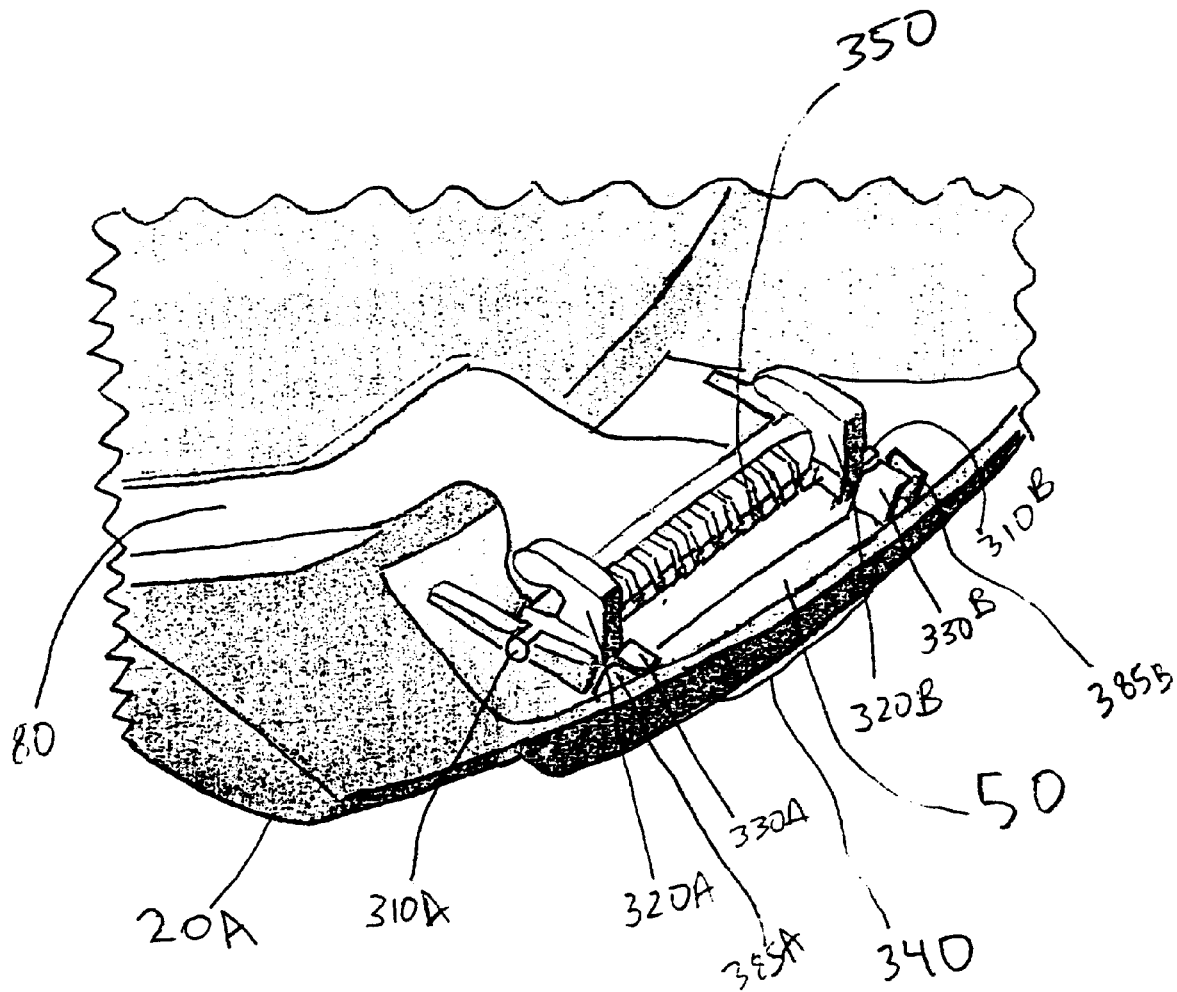
FIG. 16 illustrates a latching connector of a case in accordance with an embodiment of the present invention.

FIG. 16 illustrates a latching connector 50 of a case 100 in accordance with an embodiment of the present invention. In an embodiment, the connector 50 coupled to the back cover 20 comprises a latching connector 50. An end of the electrical link 80 couples to the latching connector 50. Here, the inner back cover is not shown.

Figure 17:
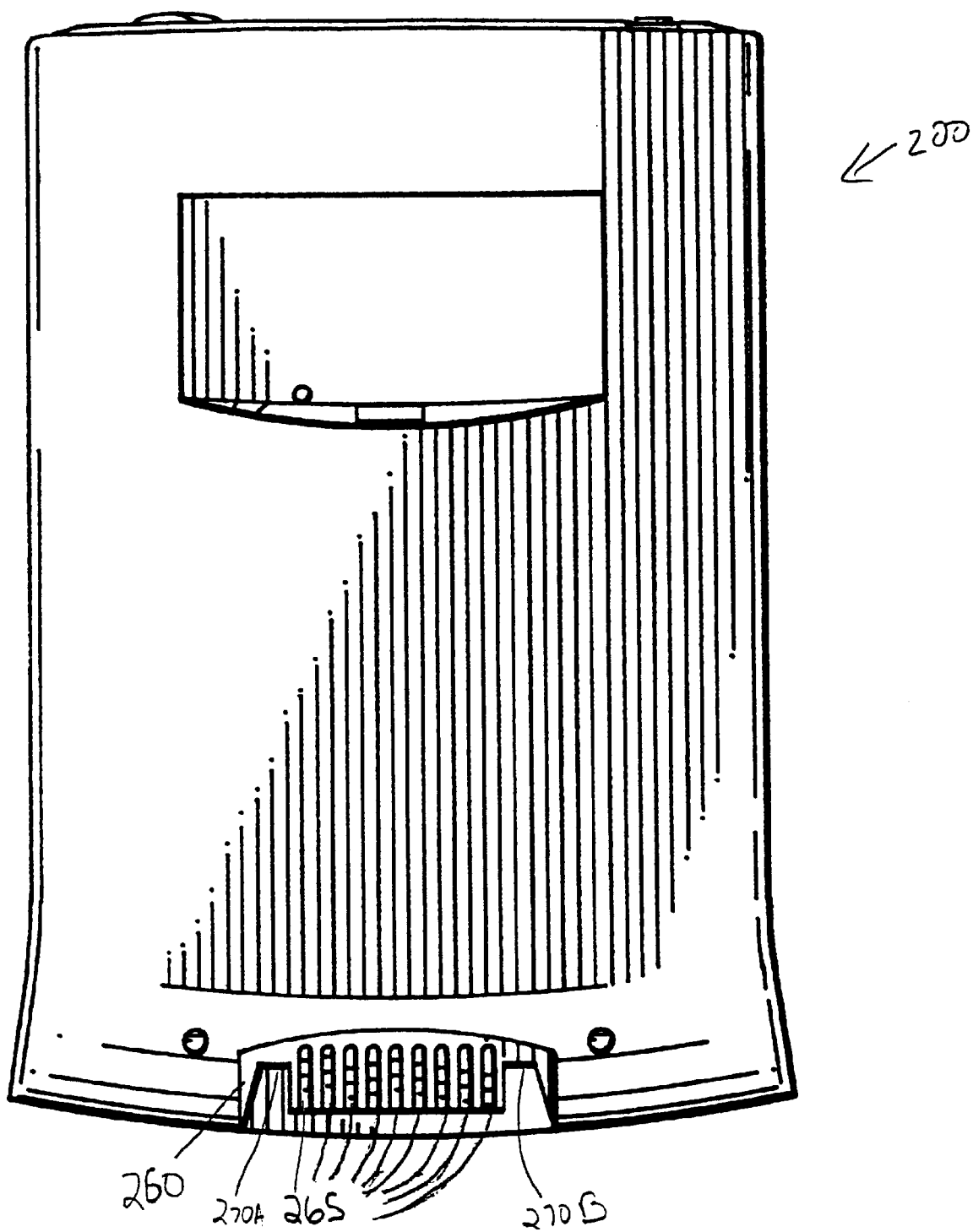
FIG. 17 illustrates a rear view of the exemplary personal digital assistant of FIG. 3.

FIG. 17 illustrates a rear view of the exemplary personal digital assistant 200 of FIG. 3. As illustrated in FIG. 17, the communication port 260 (e.g., a serial communication port 260) is located at the bottom rear of the exemplary personal digital assistant 200. The communication port 260 includes a plurality of contacts 265, a first recess 270A, and a second recess 270B.

Referring again to FIG. 16, the latching connector 50 electrically couples to the communication port 260 of the exemplary personal digital assistant 200 and couples to the exemplary personal digital assistant 200, providing a robust and secure connection for supporting wireless communication via the communication module 15 integrated into the front cover 10. Moreover, the latching connector 50 can be disengaged from the exemplary personal digital assistant 200 to gain access to the communication port 260 without removing the exemplary personal digital assistant 200 from the rod 60 of the case 100 so that the exemplary personal digital assistant 200 can be placed in a conventional cradle (as described above) which facilitates synchronizing the data of the exemplary personal digital assistant 200 with the data of a personal computer system and which facilitates recharging the batteries of the exemplary personal digital assistant 200.

Continuing with FIG. 16, the latching connector 50 includes a first pivot pin 310A, a second pivot pin 310B, a first L-shaped member 320A, a second L-shaped member 320B, and a plurality of electrical pins 350. In addition, the latching connector 50 includes a first latching hook 330A, a second latching hook 330B, and a tab 340.

The pivot pins 310A and 310B are held in respective recesses formed on the outer back cover 20A. The latching connector 50 rotates about the pivot axis formed by the pivot pins 310A and 310B. In FIG. 16, the latching connector 50 is in a latched position. The latching connector 50 can be moved to an unlatched position by rotating the latching connector 50 in a clockwise direction.

Each L-shaped member 320A and 320B engages a respective recess 270A and 270B of the communication port 260 of the exemplary personal digital assistant 200 to couple the latching connector 50 to the exemplary personal digital assistant 200.

Each latching hook 330A and 330B is operable to securely maintain the latching connector 50 in the latched position. In an embodiment, each latching hook 330A and 330B engages a respective latching member 385A and 385B of the outer back cover 20A.

In an embodiment, the latching connector 50 is rotated from the latched position to the unlatched position when a sufficient force is applied to the tab 340 (e.g., pressing with a finger). The sufficient force unlatches the latching hooks 330A and 330B. When rotated to the latched position while the case 100 is in the closed position, the latching connector 50 engages the communication port 260 with a rotating motion so that to enable a wiping interaction between the electrical pins 350 of the latching connector 50 and the electrical contacts 265 of the communication port 260 so that to remove surface debris or surface contamination such as dust, lint, or any other material. The outer back cover 20A includes an opening for allowing the latching connector 50 to pass through to a position outside the protective housing formed by the front cover and the back cover when rotated between the latched position and the unlatched position. The inner back cover (not shown) covers the recesses of the outer back cover 20A where the pivot pins 310A and 310B are inserted so that to secure the pivot pins 310A and 310B inside the recesses of the outer back cover 20A.

In an embodiment, the latching connector 50 is comprised of a plastic material such as a polycarbonate and acrylonitrile-butadienestyrene (ABS) blend.

Figure 18:
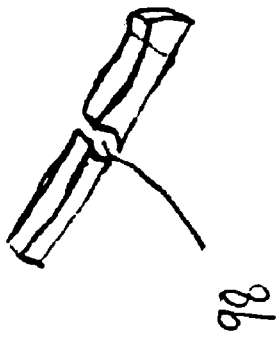
FIG. 18 illustrates a recess for inserting a pivot pin of a latching connector in accordance with an embodiment of the present invention.

FIG. 18 illustrates a recess 98 for inserting a pivot pin 310A and 310B (see FIG. 16) of a latching connector 50 in accordance with an embodiment of the present invention. The recess 98 is formed on the internal surface of the outer back cover 20A (see FIG. 16).

Figure 19:
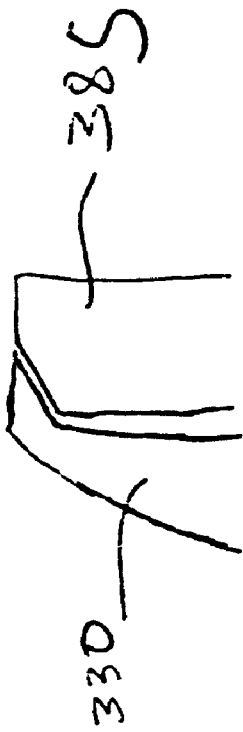
FIG. 19 illustrates a latching hook of a latching connector in accordance with an embodiment of the present invention.

FIG. 19 illustrates a latching hook 330 of a latching connector 50 in accordance with an embodiment of the present invention. The latching hook 330 engages the latching member 385 formed on the internal surface of the outer back cover 20A (see FIG. 16).

Figure 20:
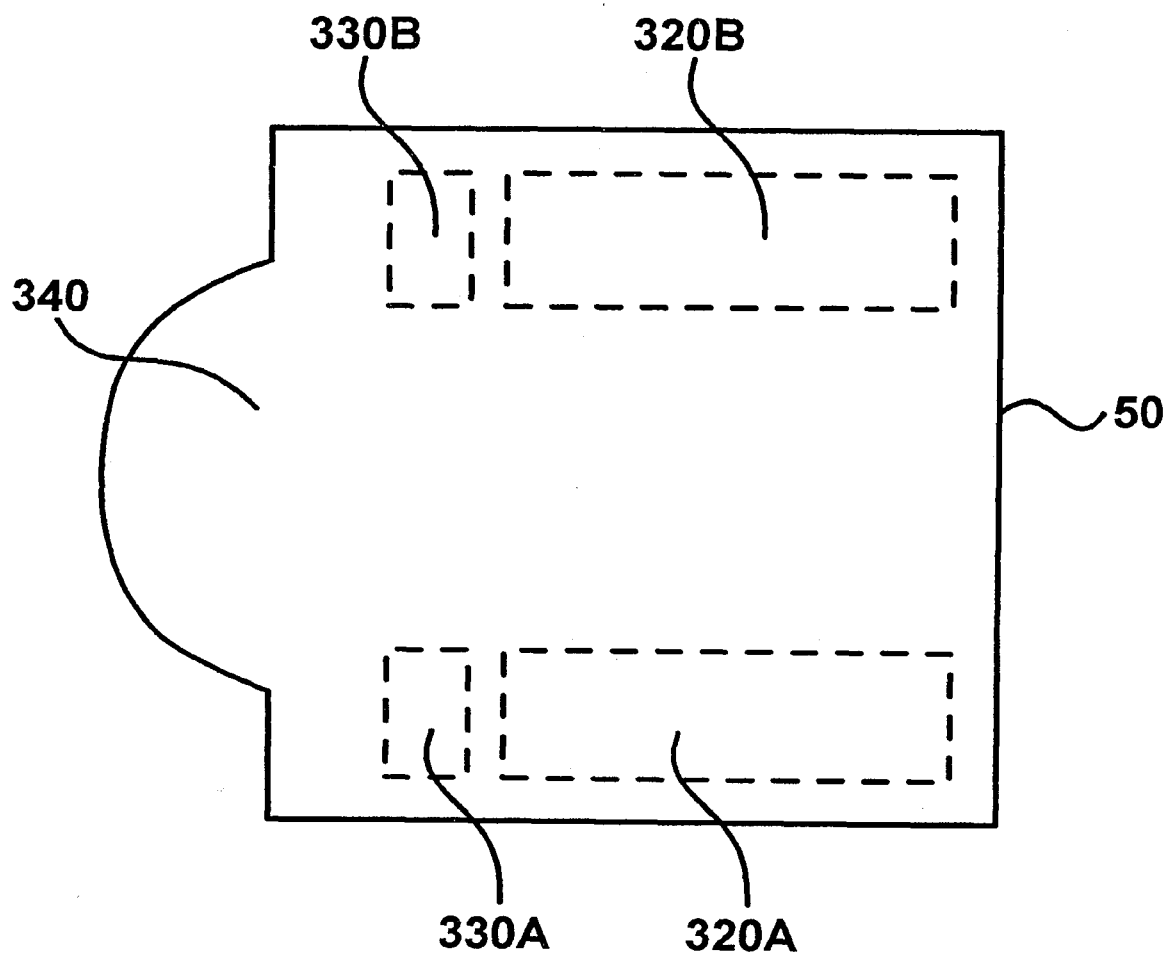
FIG. 20 illustrates a rear view of a latching connector in accordance with an embodiment of the present invention.

FIG. 20 illustrates a rear view of a latching connector 50 in accordance with an embodiment of the present invention, showing the relationship between the tab 340 and the L-shaped members 320A and 320B and the latching hooks 330A and 330B. The L-shaped members 320A and 320B and the latching hooks 330A and 330B extend perpendicular to the tab 340 as illustrated by the dashed lines.

Figure 20A:
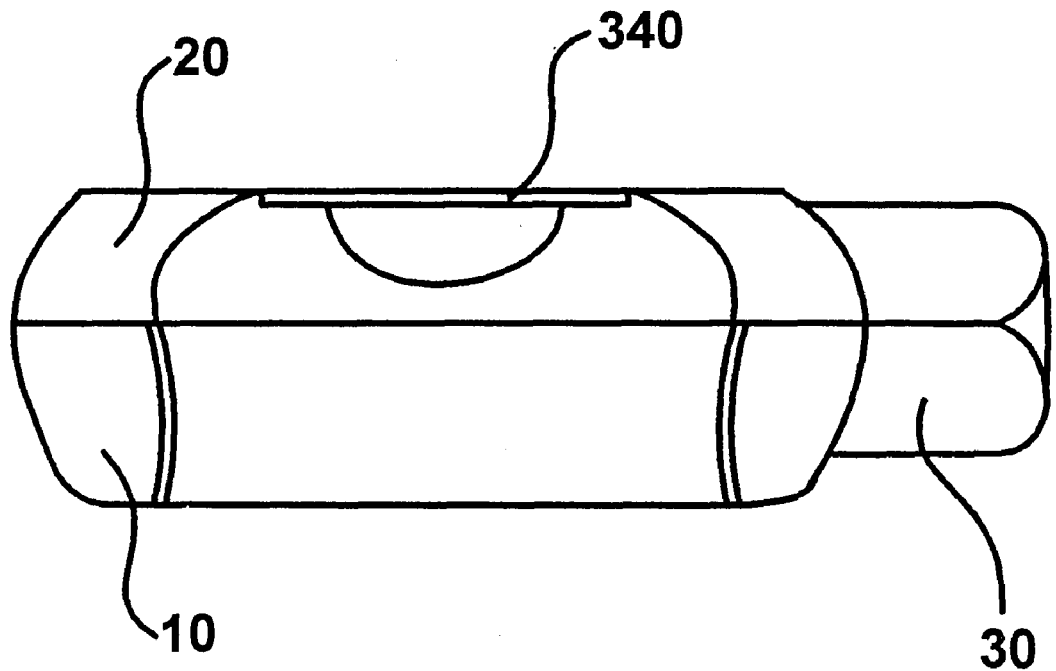
FIG. 20A illustrates a bottom view of a case in accordance with an embodiment of the present invention, showing the case in a closed position.

FIG. 20A illustrates a bottom view of a case 100 in accordance with an embodiment of the present invention, showing the case 100 in a closed position and showing the tab 340 accessible by a finger of the user.

Figure 21:
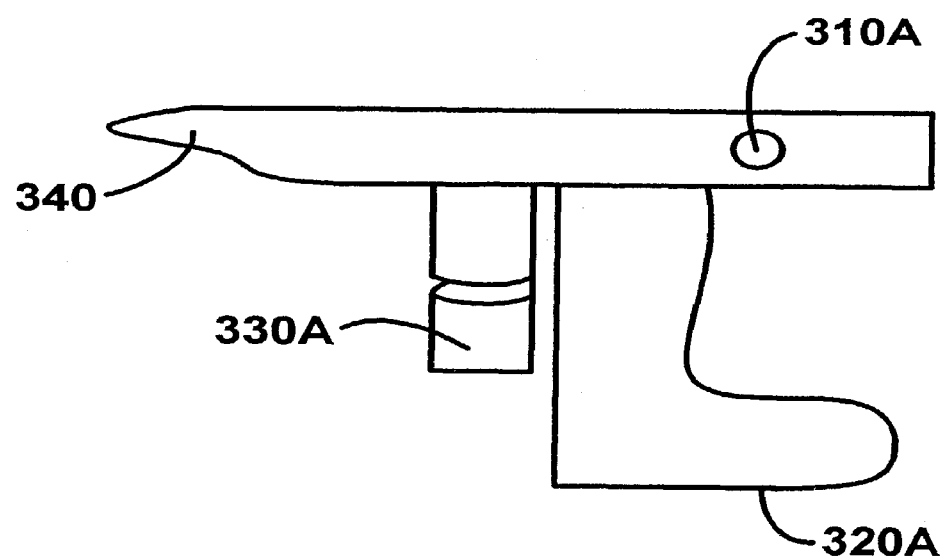
FIG. 21 illustrates a side view of a latching connector in accordance with an embodiment of the present invention.

FIG. 21 illustrates a side view of a latching connector 50 of FIG. 16 in accordance with an embodiment of the present invention.

Figure 22:
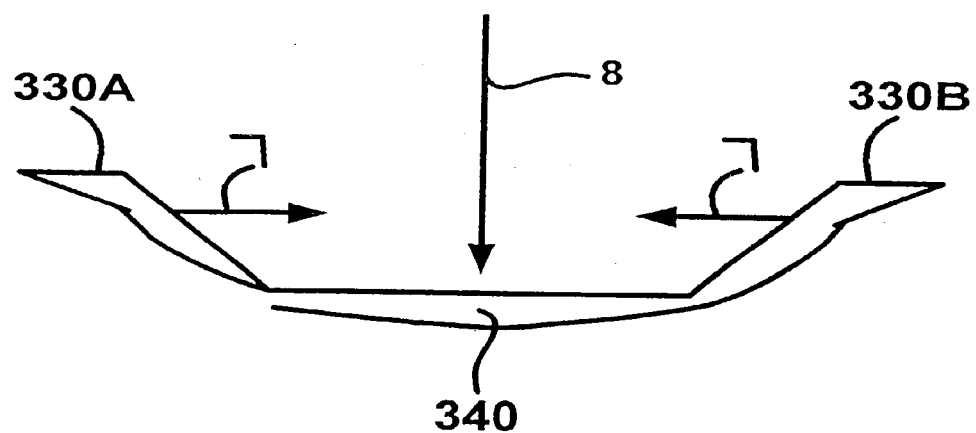
FIG. 22 illustrates the operation of a tab and a latching hook of a latching connector in accordance with an embodiment of the present invention.
Figure 23:
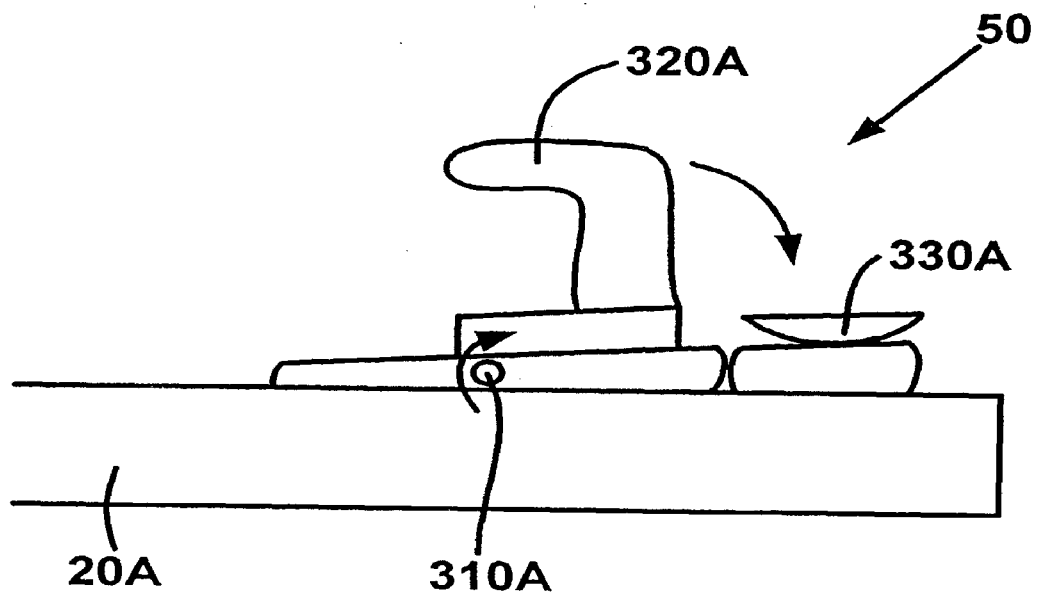
Figure 24:
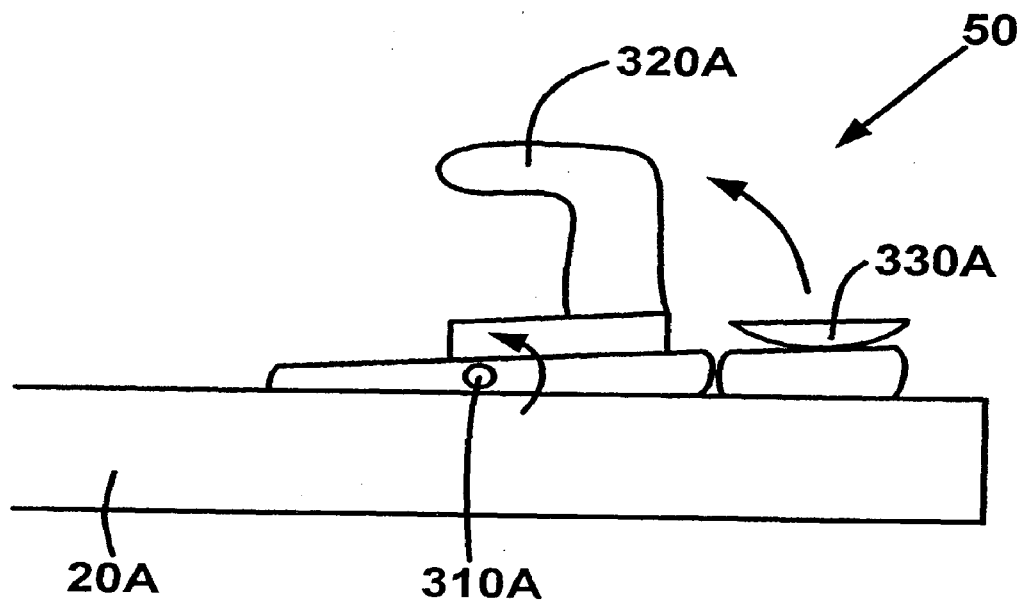

FIG. 22 illustrates the operation of a tab 340 and a latching hook 330A and 330B of a latching connector 50 of FIG. 16 in accordance with an embodiment of the present invention. When a force 8 is applied to the tab 340 to rotate the latching connector 50 to the unlatched position, the latching hooks 330A and 330B experience an inward force 7 perpendicular to the force 8 applied to the tab 340 which causes the latching hooks 330A and 330B to disengage from the latching member of the outer back cover.

Figure 23:
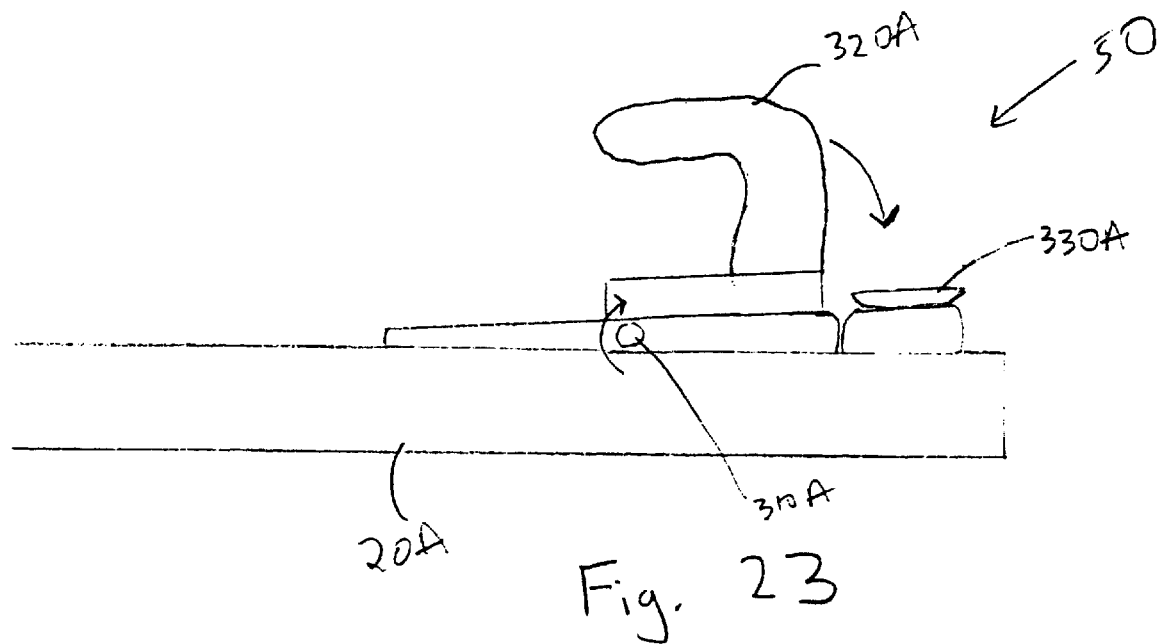
FIG. 23 illustrates a latching connector rotated to an unlatched position in accordance with an embodiment of the present invention.

FIG. 23 illustrates a latching connector 50 of FIG. 16 being rotated to an unlatched position in accordance with an embodiment of the present invention.

Figure 24:
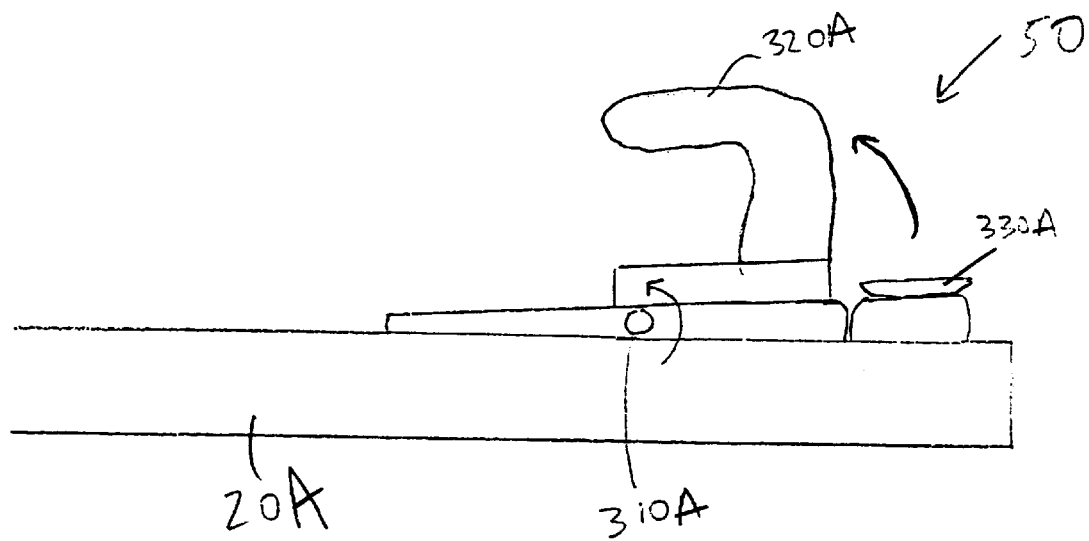
FIG. 24 illustrates a latching connector rotated to a latched position in accordance with an embodiment of the present invention.
Figure 1:
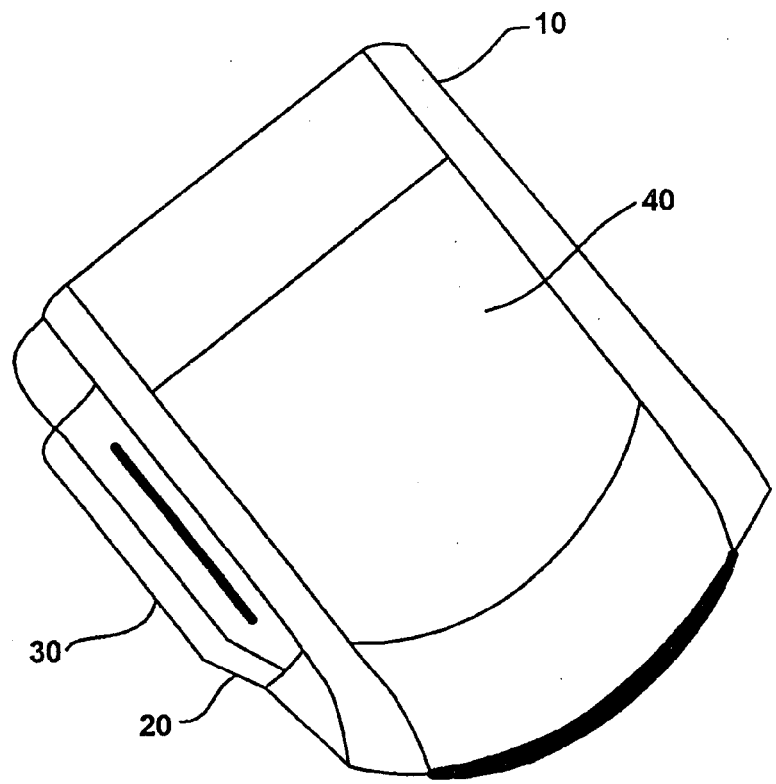
Figure 2:
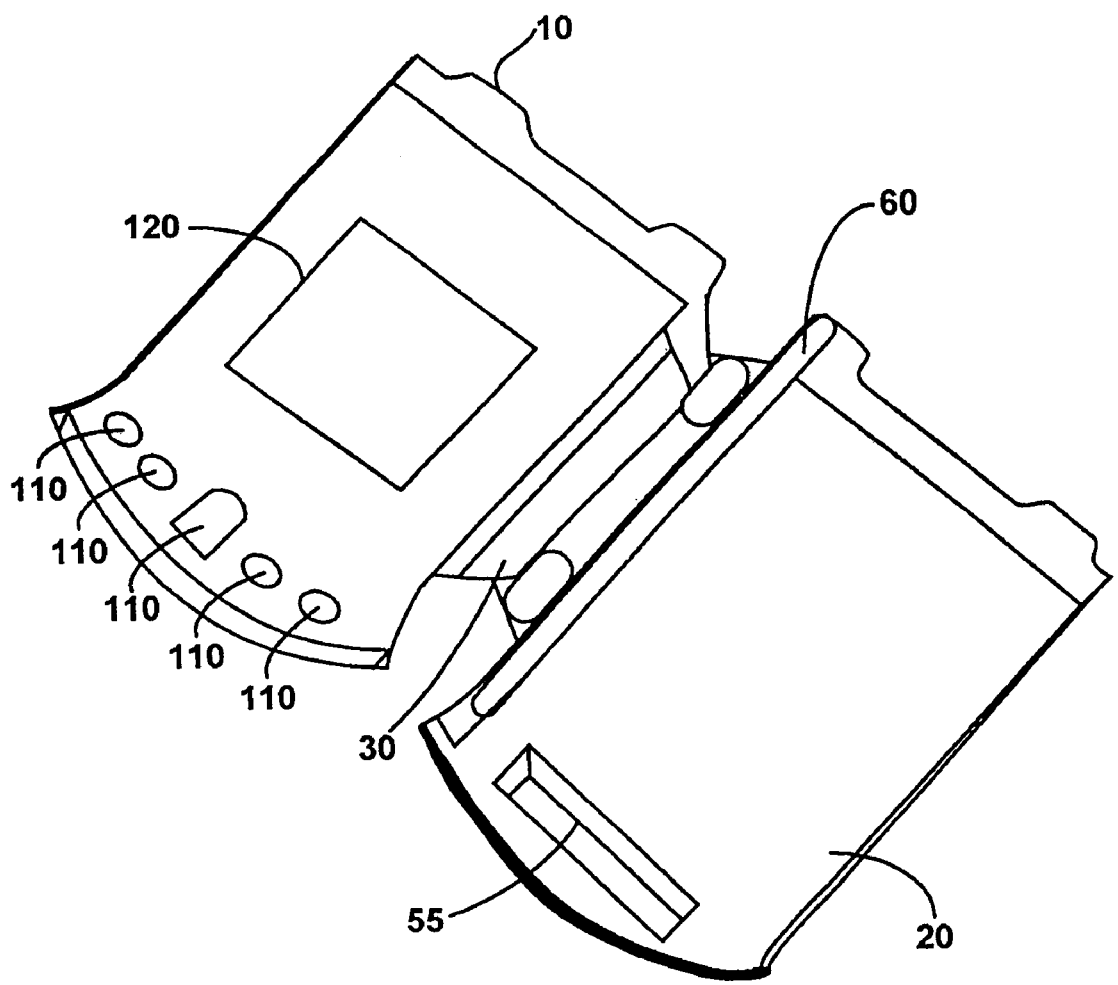
Figure 3:
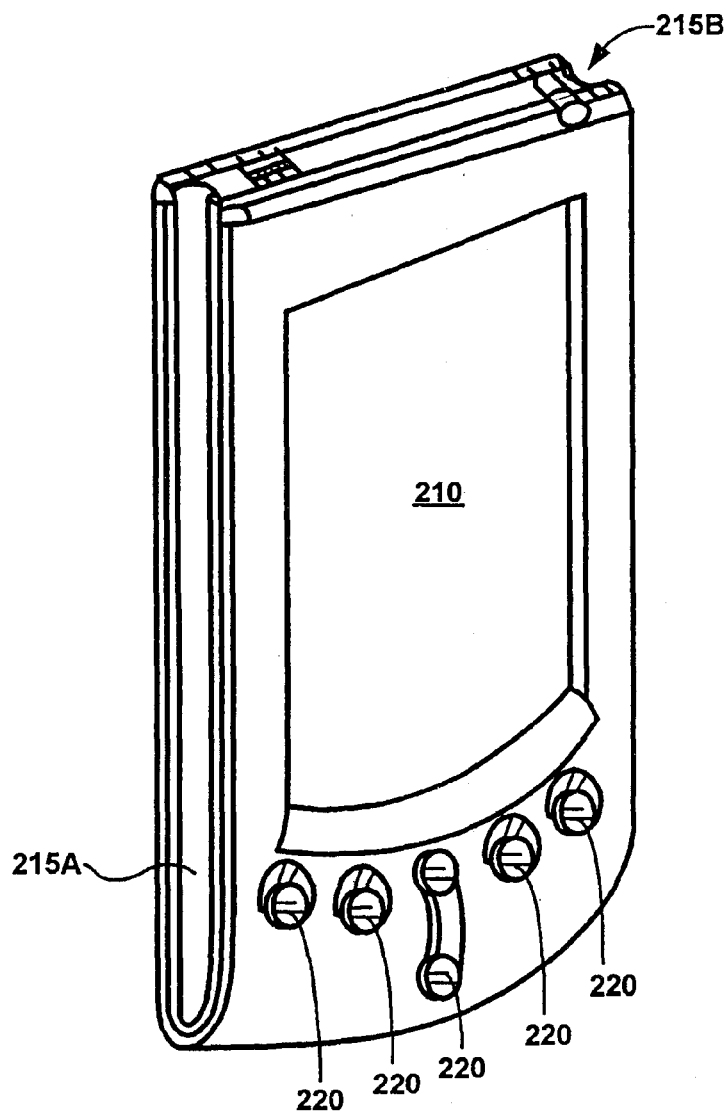
Figure 4:
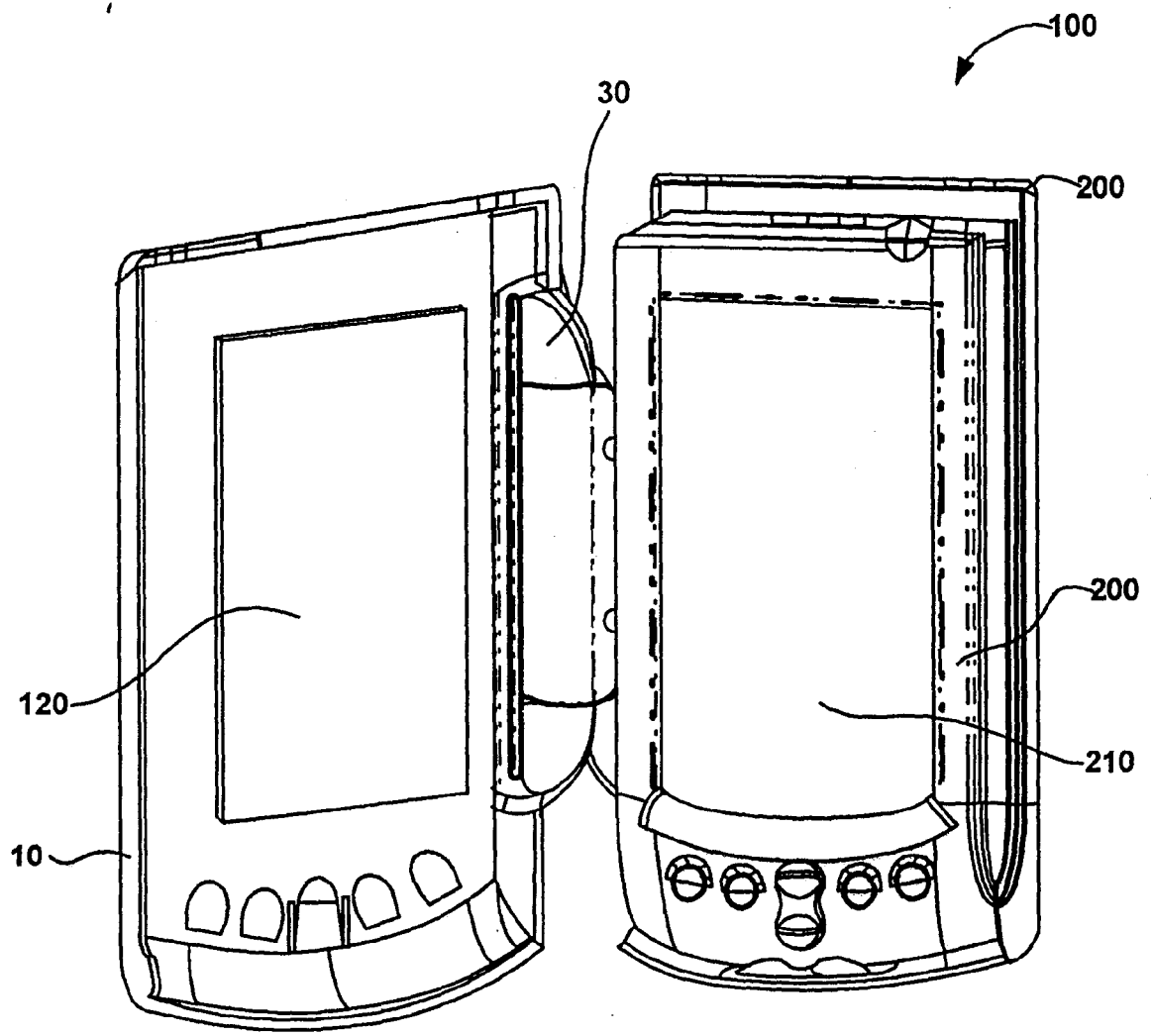

FIG. 24 illustrates a latching connector 50 of FIG. 16 being rotated to a latched position in accordance with an embodiment of the present invention.

In an alternate embodiment, the connector 50 is fixed to the back cover and does not have the pivot pins, the tab, and the latching hook, whereas the connector does not rotate. In this embodiment, the length of the front and back covers is visibly larger than the length of the personal digital assistant so that the communication port is coupled to the connector 50 by sliding the personal digital assistant into the connector 50 while coupled to the rod of the case 100.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

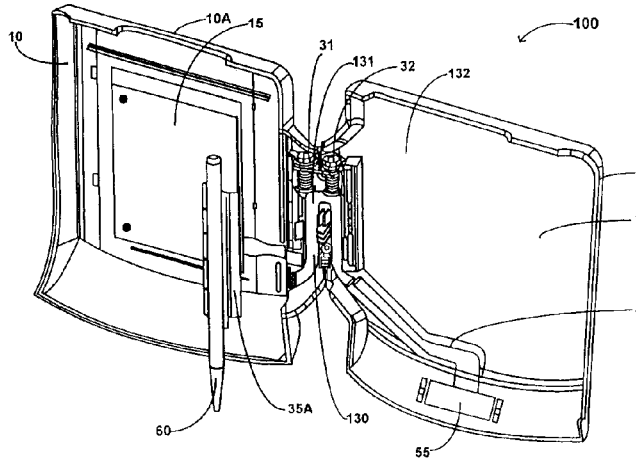

What is claimed is:

1. A case for a handheld computer system comprising:
   a hinge;
   a first cover coupled to said hinge and having:
      an outer surface having an opening;
      a first thickness, and
      a metallic member coupled to said opening, wherein said metallic member has a second thickness that is smaller than said first thickness;
   a second cover coupled to said hinge, wherein said hinge allows each of said first and second covers to independently rotate relative to one another to form a protective housing for said handheld computer system; and
   a communication module integrated into said first cover, said communication module configured to transmit and receive data for said handheld computer system.

2. A case as recited in claim 1 further comprising an electrical link having a first end coupled to said communication module and a second end terminating on said second cover such that to facilitate coupling a communication port of said handheld computer system to said electrical link, wherein a portion of said electrical link is passed through said hinge.

3. A case as recited in claim 2 further comprising a connector coupled to said second end of said electrical link, wherein said connector is configured to couple to said communication port of said handheld computer system.

4. A case as recited in claim 2 wherein said electrical link comprises a flex circuit.

5. A case as recited in claim 2 wherein said electrical link comprises a flat flexible cable (FFC).

6. A case as recited in claim 2 wherein said electrical link comprises a flexible printed circuit (FPC).

7. A case as recited in claim 1 wherein said first cover further includes an outer first cover and an inner first cover coupled to said outer first cover so that to increase a section modulus of said first cover, and wherein said outer first cover forms an external surface of said protective housing and said inner first cover forms an internal surface of said protective housing.

8. A case as recited in claim 7 wherein said outer first cover includes said opening, wherein said inner first cover includes a recess that extends away from said outer first cover and that is configured to occupy a space above a display device of said handheld computer system when said first and second covers form said protective housing for said handheld computer system positioned between said first and second covers, and wherein said communication module is positioned between said metallic member and said recess of said inner first cover to reduce a stack thickness formed by said outer first cover, said metallic member, said communication module, and said inner first cover.

9. A case as recited in claim 1 wherein said second cover includes an outer second cover and an inner second cover coupled to said outer second cover so that to increase a section modulus of said second cover, and wherein said outer second cover forms an external surface of said protective housing and said inner second cover forms an internal surface of said protective housing.

10. A case as recited in claim 1 wherein said hinge includes a rod for inserting into a slot of said handheld computer system so that to couple said handheld computer system to said case.

11. A case as recited in claim 1 wherein said communication module comprises a Bluetooth radio system.

12. A case as recited in claim 1 wherein said handheld computer system comprises a personal digital assistant.

13. A case as recited in claim 1 wherein said first and second covers each includes an external side and an internal side, wherein said first and second covers rotate into a fully open position in which said first and second covers are arranged generally external side to external side, wherein said first and second covers rotate into a closed position in which said first and second covers are arranged generally internal side to internal side.

14. A case as recited in claim 1 wherein said hinge comprises a double pin hinge.

15. A case for a handheld computer system comprising:
 a hinge having a first pivot pin channel and a second pivot pin channel;
 a first cover coupled to said first pivot pin channel and having:
  an outer surface having an opening;
  a first thickness, and
  a metallic member coupled to said opening, wherein said metallic member has a second thickness that is smaller than said first thickness;
 a second cover coupled to said second pivot pin channel, wherein said hinge allows each of said first and second covers to independently rotate relative to one another to form a protective housing for said handheld computer system; and
 a communication module integrated into said first cover, said communication module configured to transmit and receive data for said handheld computer system.

16. A case as recited in claim 15 further comprising an electrical link having a first end coupled to said communication module and a second end terminating on said second cover such that to facilitate coupling a communication port of said handheld computer system to said electrical link, wherein a first portion of said electrical link is passed through said first pivot pin channel, wherein a second portion of said electrical link is passed through said second pivot pin channel, and wherein a third portion of said electrical link is pass through a cavity of said hinge which is between said first and second pivot pin channels.

17. A case as recited in claim 16 further comprising a connector coupled to said second end of said electrical link, wherein said connector is configured to couple to said communication port of said handheld computer system.

18. A case as recited in claim 16 wherein said electrical link comprises a flex circuit.

19. A case as recited in claim 16 wherein said electrical link comprises a flat flexible cable (FFC).

20. A case as recited in claim 16 wherein said electrical link comprises a flexible printed circuit (FPC).

21. A case as recited in claim 15 wherein said first cover further includes an outer first cover and an inner first cover coupled to said outer first cover so that to increase a section modulus of said first cover, and wherein said outer first cover forms an external surface of said protective housing and said inner first cover forms an internal surface of said protective housing.

22. A case as recited in claim 21 wherein said outer first cover includes said opening, wherein said inner first cover includes a recess that extends away from said outer first cover and that is configured to occupy a space above a display device of said handheld computer system when said first and second covers form said protective housing for said handheld computer system positioned between said first and second covers, and wherein said communication module is positioned between said metallic member and said recess of said inner first cover to reduce a stack thickness formed by said outer first cover, said metallic member, said communication module, and said inner first cover.

23. A case as recited in claim 15 wherein said second cover includes an outer second cover and an inner second cover coupled to said outer second cover so that to increase a section modulus of said second cover, and wherein said outer second cover forms an external surface of said protective housing and said inner second cover forms an internal surface of said protective housing.

24. A case as recited in claim 15 wherein said hinge further includes a rod for inserting into a slot of said handheld computer system so that to couple said handheld computer system to said case.

25. A case as recited in claim 15 wherein said communication module comprises a Bluetooth radio system.

26. A case as recited in claim 15 wherein said handheld computer system comprises a personal digital assistant.

27. A case as recited in claim 15 wherein said first and second covers each includes an external side and an internal side, wherein said first and second covers rotate into a fully open position in which said first and second covers are arranged generally external side to external side, wherein said first and second covers rotate into a closed position in which said first and second covers are arranged generally internal side to internal side.

28. A case as recited in claim 15 wherein said hinge comprises a double pin hinge.

29. A case for a handheld computer system comprising:
  a hinge having a first pivot pin channel and a second pivot pin channel;
  a first cover coupled to said first pivot pin channel;
  a second cover coupled to said second pivot pin channel, wherein said hinge allows each of said first and second covers to independently rotate relative to one another to form a protective housing for said handheld computer system; and
  a communication module integrated into said first cover, said communication module configured to transmit and receive data for said handheld computer system, wherein said hinge further includes a rod for inserting into a slot of said handheld computer system so that to couple said handheld computer system to said case.

30. A case as recited in claim 29 further comprising an electrical link having a first end coupled to said communication module and a second end terminating on said second cover such that to facilitate coupling a communication port of said handheld computer system to said electrical link, wherein a first portion of said electrical link is passed through said first pivot pin channel, wherein a second portion of said electrical link is passed through said second pivot pin channel, and wherein a third portion of said electrical link is pass through a cavity of said hinge which is between said first and second pivot pin channels.

31. A case as recited in claim 30 further comprising a connector coupled to said second end of said electrical link, wherein said connector is configured to couple to said communication port of said handheld computer system.

32. A case as recited in claim 30 wherein said electrical link comprises a flex circuit.

33. A case as recited in claim 30 wherein said electrical link comprises a flat flexible cable (FFC).

34. A case as recited in claim 30 wherein said electrical link comprises a flexible printed circuit (FPC).

35. A case as recited in claim 29 wherein said first cover further includes an outer first cover and an inner first cover coupled to said outer first cover so that to increase a section modulus of said first cover, and wherein said outer first cover forms an external surface of said protective housing and said inner first cover forms an internal surface of said protective housing.

36. A case as recited in claim 35 wherein said first cover has:
  an outer surface having an opening;
  a first thickness, and
  a metallic member coupled to said opening, wherein said metallic member has a second thickness that is smaller than said first thickness.

37. A case as recited in claim 36 wherein said outer first cover includes said opening, wherein said inner first cover includes a recess that extends away from said outer first cover and that is configured to occupy a space above a display device of said handheld computer system when said first and second covers form said protective housing for said handheld computer system positioned between said first and second covers, and wherein said communication module is positioned between said metallic member and said recess of said inner first cover to reduce a stack thickness formed by said outer first cover, said metallic member, said communication module, and said inner first cover.

38. A case as recited in claim 29 wherein said second cover includes an outer second cover and an inner second cover coupled to said outer second cover so that to increase a section modulus of said second cover, and wherein said outer second cover forms an external surface of said protective housing and said inner second cover forms an internal surface of said protective housing.

39. A case as recited in claim 29 wherein said communication module comprises a Bluetooth radio system.

40. A case as recited in claim 29 wherein said handheld computer system comprises a personal digital assistant.

41. A case as recited in claim 29 wherein said first and second covers each includes an external side and an internal side, wherein said first and second covers rotate into a fully open position in which said first and second covers are arranged generally external side to external side, wherein said first and second covers rotate into a closed position in which said first and second covers are arranged generally internal side to internal side.

42. A case as recited in claim 29 wherein said hinge comprises a double pin hinge.

\* \* \* \* \*

UNITED STATES PATENT AND TRADEMARK OFFICE
CERTIFICATE OF CORRECTION

PATENT NO. : 6,445,577 B1
DATED : September 3, 2002
INVENTOR(S) : Brent D. Madsen, Eric Michael Lunsford and David Moore It is certified that error appears in the above-identified patent and that said Letters Patent is hereby corrected as shown below:

Delete title page and substitute therefor the attached title page.

Delete Drawing sheets 1-18 and substitute therefor the attached Drawing Sheets 1-25.

Signed and Sealed this

Twenty-second Day of July, 2003

JAMES E. ROGAN
*Director of the United States Patent and Trademark Office*

(12) United States Patent
Madsen et al.

(10) Patent No.: US 6,445,577 B1
(45) Date of Patent: Sep. 3, 2002

(54) CASE WITH COMMUNICATION MODULE HAVING A DOUBLE PIN HINGE FOR A HANDHELD COMPUTER SYSTEM

(75) Inventors: Brent D. Madsen, Providence, UT (US); Eric Michael Lunsford, San Carlos, CA (US); David Moore, Riverton, UT (US)

(73) Assignee: 3Com Corporation, Santa Clara, CA (US)

( * ) Notice: Subject to any disclaimer, the term of this patent is extended or adjusted under 35 U.S.C. 154(b) by 31 days.

(21) Appl. No.: 09/665,492

(22) Filed: Sep. 20, 2000

(51) Int. Cl.[7] ............................................. H05K 5/00
(52) U.S. Cl. ..................... 361/683; 361/680; 361/679; 361/727; 206/320; 220/334
(58) Field of Search ................... 361/679, 680, 361/681–683, 726–727, 736, 755, 741, 747, 752, 748, 759, 786, 796–803, 816, 818, 825, 829, 784; 341/22; 345/168–172, 905; 235/145; 248/917, 176.1, 176.3, 346.03, 912; 400/489, 682, 691–693; 312/208.1, 206.4; 366/708.1; 174/35 R, 51; 379/433, 428, 434, 438; 455/90, 300, 30; 403/331; 307/89–91; 439/65–67, 341, 165.31; 206/320, 305; 211/13.1, 26, 26.1, 26.2

(56) References Cited

U.S. PATENT DOCUMENTS

| | | | | |
|---|---|---|---|---|
| 4,825,395 A | * | 4/1989 | Kinser et al. | 364/708 |
| 5,002,184 A | * | 3/1991 | Lloyd | 206/305 |
| 5,337,061 A | * | 8/1994 | Pye et al. | 343/702 |
| 5,640,689 A | * | 6/1997 | Rossi | 455/89 |
| 5,827,082 A | * | 10/1998 | Laine | 439/165 |
| 5,898,600 A | * | 4/1999 | Isashi | 364/705.01 |
| 5,995,373 A | * | 11/1999 | Nagai | 361/755 |
| D426,236 S | * | 6/2000 | Kim et al. | D14/345 |
| 6,079,993 A | * | 6/2000 | Laine | 439/165 |
| 6,239,968 B1 | * | 5/2001 | Kim et al. | 361/679 |
| D445,106 S | * | 7/2001 | Mosgrove et al. | D14/338 |
| 6,266,240 B1 | * | 7/2001 | Urban et al. | 361/686 |
| D447,478 S | * | 9/2001 | Madsen et al. | D14/341 |
| 6,317,313 B1 | * | 11/2001 | Mosgrove et al. | 361/680 |

FOREIGN PATENT DOCUMENTS

| | | | | | |
|---|---|---|---|---|---|
| JP | 408016859 A | * | 1/1996 | | G07C/09/00 |
| JP | 410262105 A | * | 9/1998 | | H04M/01/21 |

* cited by examiner

*Primary Examiner*—Darren Schuberg
*Assistant Examiner*—Michael Datskovsky
(74) *Attorney, Agent, or Firm*—Wagner, Murabito & Hao LLP

(57) ABSTRACT

A case for a handheld computer system is described. In an embodiment, the handheld computer system comprises a personal digital assistant. The case has multi-functional capability. The case provides a protective housing for the personal digital assistant and includes a communication module which is integrated into the case for protection against damage, whereas the communication module transmits and receives data for the personal digital assistant. In an embodiment, the communication module comprises a radio frequency (RF) wireless communication device. In an embodiment, the case includes a front cover and a back cover coupled to the front cover via a double pin hinge. The personal digital assistant is inserted between the front and back covers, whereas the front cover protects the front of the personal digital assistant while the back cover protects the back of the personal digital assistant. The double pin hinge allows the front and back covers to rotate to a generally back-to-back position and to rotate to a generally front-to-front position, facilitating approximately 360 degree rotation about the double pin hinge by the combination of the rotations of each of the front and back covers. Additionally, the communication module is integrated into the front cover. The back cover includes a connector which couples to a communication port located on the back of the personal digital assistant, whereas the connector couples to the personal digital assistant inserted inside the protective housing formed by the front and back covers.

42 Claims, 18 Drawing Sheets